(12) United States Patent
Aio

(10) Patent No.: US 12,464,519 B2
(45) Date of Patent: Nov. 4, 2025

(54) WIRELESS COMMUNICATION DEVICES AND METHODS FOR UPLINK TRANSMISSION

(71) Applicant: Sony Group Corporation, Tokyo (JP)

(72) Inventor: Kosuke Aio, Tokyo (JP)

(73) Assignee: SONY GROUP CORPORATION, Tokyo (JP)

( * ) Notice: Subject to any disclaimer, the term of this patent is extended or adjusted under 35 U.S.C. 154(b) by 378 days.

(21) Appl. No.: 18/042,600

(22) PCT Filed: Sep. 1, 2021

(86) PCT No.: PCT/JP2021/032046
§ 371 (c)(1),
(2) Date: Feb. 23, 2023

(87) PCT Pub. No.: WO2022/059483
PCT Pub. Date: Mar. 24, 2022

(65) Prior Publication Data
US 2023/0337226 A1 Oct. 19, 2023

(30) Foreign Application Priority Data

Sep. 15, 2020 (JP) ................. 2020-154331

(51) Int. Cl.
| | |
|---|---|
| *H04W 72/1268* | (2023.01) |
| *H04L 5/00* | (2006.01) |
| *H04W 72/23* | (2023.01) |
| *H04W 72/232* | (2023.01) |
| *H04W 74/00* | (2009.01) |

(Continued)

(52) U.S. Cl.
CPC ....... *H04W 72/1268* (2013.01); *H04L 5/0035* (2013.01); *H04L 5/0053* (2013.01); *H04L 5/0091* (2013.01); *H04W 72/23* (2023.01); *H04W 72/232* (2023.01); *H04W 74/002* (2013.01); *H04B 7/024* (2013.01); *H04W 84/12* (2013.01)

(58) Field of Classification Search
CPC .......... H04W 72/1268; H04W 72/232; H04W 84/12; H04W 74/002; H04W 72/23; H04B 7/024; H04L 5/0035; H04L 5/0053; H04L 5/0091
See application file for complete search history.

(56) References Cited

FOREIGN PATENT DOCUMENTS

| | | |
|---|---|---|
| CN | 103548394 B | 2/2017 |
| CN | 107770867 A | 3/2018 |

(Continued)

OTHER PUBLICATIONS

English translation of WO-2021162334-A1, 2021, retrieved from PE2E Search on Apr. 29, 2025. (Year: 2021).*

(Continued)

*Primary Examiner* — Omar J Ghowrwal
(74) *Attorney, Agent, or Firm* — XSENSUS LLP

(57) ABSTRACT

A wireless communication device and method that performs uplink transmission in coordination with another wireless communication device, and acquires transmission method information indicating a transmission method of a downlink control signal which is a control signal necessary for the uplink transmission or information necessary for determining the transmission method from the another wireless communication device.

15 Claims, 33 Drawing Sheets

(51) Int. Cl.
*H04B 7/024* (2017.01)
*H04W 84/12* (2009.01)

(56) References Cited

FOREIGN PATENT DOCUMENTS

| EP | 3323264 B1 | 4/2020 | | |
|---|---|---|---|---|
| TW | 200939814 A | 9/2009 | | |
| TW | 201828617 A | 8/2018 | | |
| WO | 2019/153756 A1 | 8/2019 | | |
| WO | WO-2020011000 A1 | 1/2020 | | |
| WO | WO-2021162334 A1 | * | 8/2021 | ............ H04B 7/024 |

OTHER PUBLICATIONS

English translation of WO-2019153756-A1, 2019, retrieved from PE2E Search on Apr. 29, 2025. (Year: 2019).*

International Search Report and Written Opinion mailed on Nov. 2, 2021, received for PCT Application PCT/JP2021/032046, filed on Sep. 1, 2021, 8 pages including English Translation.
Guo et al., "A unified transmission procedure for multi-AP coordination", IEEE 802.11-19/1102r0, Available Online at: https://mentor.ieee.org/802.11/dcn/19/11-19-1102-00-00be-a-unified-transmission-procedure-for-multi-ap-coordination.pptx, Jul. 2, 2019, pp. 1-8.
Doostnejad et al., "Uplink Coordinated Multi-AP", IEEE 802.11-19/1903r0, Nov. 11, 2019, pp. 1-23.
Seok et al., "Coordinated Spatial Reuse (C-SR) Protocol", IEEE 802.11-20/0576r1, Available Online at: https://mentor.ieee.org/802.11/documents?is_dcn=576&is_year=2020, May 7, 2020, pp. 1-21.
Sungjin Park et al, "Multi-AP Transmission Procedure", IEEE Draft; 11-19-0804-00BE-Multi-AP-Transmission-Procedure, IEEE-SA Mentor, Piscataway, NJ USA, vol. 802.11 EHT; 802.11be May 13, 2019 (May 13, 2019), pp. 1-14, XP068151150.

* cited by examiner

WIRELESS COMMUNICATION DEVICES AND METHODS FOR UPLINK TRANSMISSION

CROSS-REFERENCE TO RELATED APPLICATIONS

The present application is based on PCT filing PCT/JP2021/032046, filed Sep. 1, 2021, which claims priority to Japanese Application No. 2020-154331, filed Sep. 15, 2020, the entire contents of each are incorporated herein by reference.

TECHNICAL FIELD

The present technology relates to a wireless communication device and a method, and more particularly, to a wireless communication device capable of performing optimal data transmission according to a situation, and a method.

BACKGROUND ART

In recent years, an environment in which a plurality of wireless LAN access points (hereinafter, AP) is placed in a stadium or a home has increased, and a multi-AP coordination technology that aims to improve throughput and reliability of a system by coordination between APs has attracted attention. In Coordinated Spatial Reuse (C-SR), which is one of the multi-AP coordination technologies, basic set services (BSSs) simultaneously perform communication while performing transmission power control, and thus it is expected that a wireless capacity can be improved by simultaneous transmission of a plurality of the BSSs while preventing a communication quality deterioration caused by interference.

Non-Patent Document 1 discloses a technology for performing C-SR at the time of UL transmission by using uplink (hereinafter UL) orthogonal frequency division multiple access (OFDMA) of IEEE 802.11ax. The uplink transmission means transmission to an AP from a station (hereinafter, STA) that is a terminal under the control of the AP. Conversely, transmission from the AP to the STA is referred to as downlink (hereinafter, DL) transmission.

According to the technology described in Non-Patent Document 1, on the premise that a plurality of the APs can acquire all the information of a propagation loss between the APs and the STAs, an AP (hereinafter, sharing AP) that has acquired a transmission opportunity by performing backoff or the like transmits information indicating that C-SR is to be performed to another AP (hereinafter, shared AP) that can coordinate. Thereafter, both the sharing AP and the shared AP transmit a trigger frame, which is one of DL control frames required for UL C-SR, to trigger UL transmission from the STA.

Since the STA sets its own transmission power on the basis of information included in the trigger frame and starts transmission, the sharing AP and the shared AP can perform transmission power control of the STA to suppress an interference amount given to each other. The technology described in Non-Patent Document 1 enables STAs in a plurality of the BSSs to perform data transmission by using the same resource at the same time, and significant improvement in wireless capacity can be expected.

CITATION LIST

Non-Patent Document

Non-Patent Document 1: Yongho Seok, "Coordinated Spatial Reuse (C-SR) Protocol", [online], May 7, 2020, IEEE, [retrieved on Aug. 13, 2020], Internet, <URL: https://mentor.ieee.org/802.11/documents?is_dcn=576&is_year=2020>

SUMMARY OF THE INVENTION

Problems to be Solved by the Invention

However, Non-Patent Document 1 does not disclose a transmission method of a DL control frame. The transmission method of a DL control frame can be roughly divided into five methods. Among the methods, from the viewpoint of frequency utilization efficiency, media access control (MAC) overhead, and the like, it is preferable that the DL control frame can be transmitted using a transmission method in Non Duplicate in which different data is transmitted using the same resource at the same time as much as possible.

However, in the transmission method in Non Duplicate, a case where signals interfere with each other depending on a reception position and a frame cannot be correctly decoded due to a low signal to interference and noise ratio (SINR) is considered, and it is desirable that the AP selectively use the transmission method in Non Duplicate and other transmission methods.

The present technology has been made in view of such a situation, and enables optimal data transmission according to the situation.

Solutions to Problems

According to an aspect of the present technology, there is provided a wireless communication device including: a wireless communication unit configured to perform uplink transmission, which is transmission from a wireless communication terminal, in coordination with another wireless communication device; and a communication control unit configured to acquire, from the another wireless communication device, transmission method information indicating a transmission method of a downlink control signal which is a control signal necessary for the uplink transmission, or information necessary for determining the transmission method.

In the aspect of the present technology, the uplink transmission that is transmission from the wireless communication terminal is performed in coordination with the another wireless communication device. Furthermore, transmission method information indicating a transmission method of a downlink control signal which is a control signal necessary for the uplink transmission, or information necessary for determining the transmission method is acquired from the another wireless communication device.

MODE FOR CARRYING OUT THE INVENTION

Hereinafter, modes for carrying out the present technology will be described. A description will be given in the following order.

1. System Configuration and Related Art
2. First Embodiment (In a case where Determining Party of Transmission Method is Sharing AP, and Transmission Parameter is Adjustable)
3. Second Embodiment (In a case where Determining Parties of Transmission Method are Sharing AP and Shared AP, and Transmission Parameter is not Adjustable)
4. Third Embodiment (In a case where Determining Parties of Transmission Method are Sharing AP and Shared AP, and Transmission Parameter is Adjustable)
5. Others 1. System Configuration and Related Art <Configuration Example of Wireless Communication System>

Figure 1:
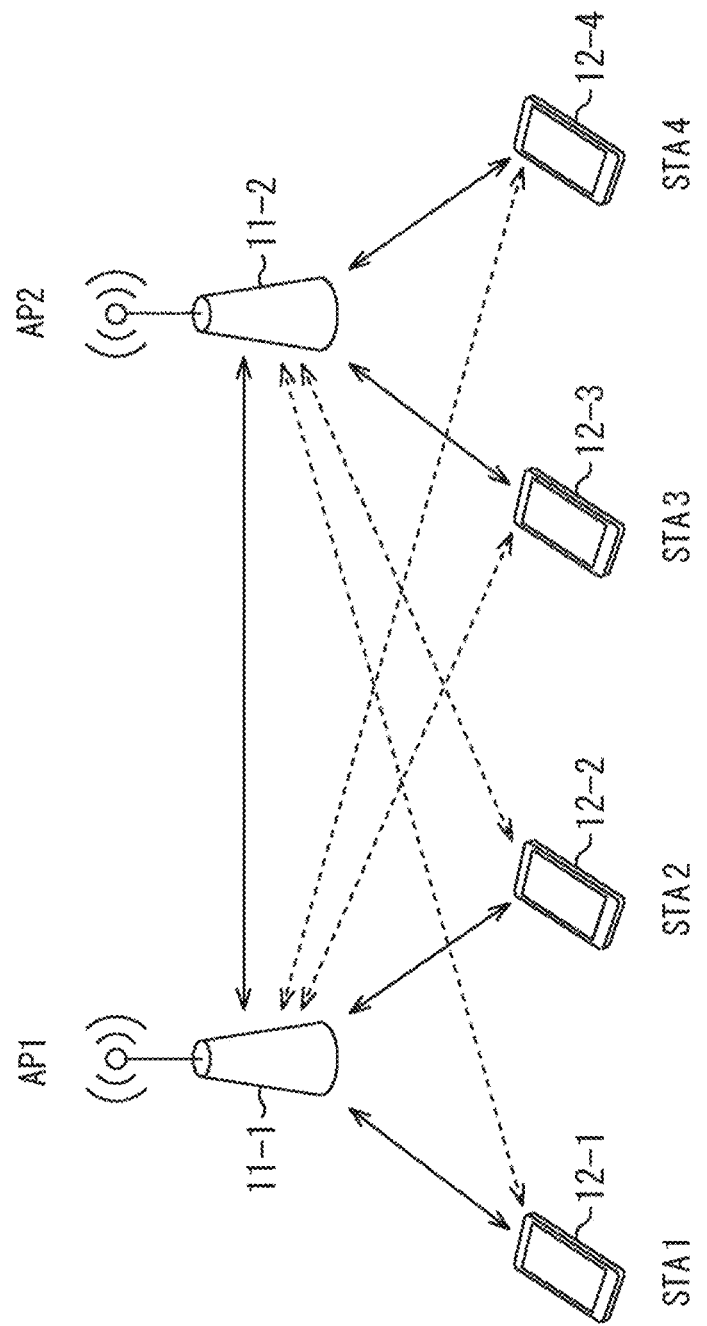
FIG. 1 is a diagram illustrating a configuration example of a wireless communication system of the present technology.

FIG. 1 is a diagram illustrating a configuration example of a wireless communication system according to an embodiment of the present technology.

In FIG. 1, a solid arrow indicates that devices are connected to each other, and a dashed arrow indicates that power is exchanged between the devices. An access point (AP) indicates a base station in a wireless local area network (LAN). A station (STA) indicates a wireless communication terminal.

The wireless communication system of FIG. 1 is configured by connecting an AP 1 and an AP 2 by wired communication or wireless communication. A wireless communication device 11-1 and a wireless communication device 11-2 are devices that operate as the AP 1 and the AP 2, respectively. Furthermore, the wireless communication system is configured such that a STA 1 and a STA 2 are connected to the AP 1 by wireless communication, and STA 3 and STA 4 are connected to the AP 2 by wireless communication. A wireless communication terminal 12-1 to a wireless communication terminal 12-4 are devices that operate as the STA 1 to the STA 4, respectively.

The STA 1 and STA 2 connected to the AP 1 by wireless communication belong to the same BSS (synonymous with a cell) as that of the AP 1, and are referred to as a STA under the control of the AP 1. The STA 3 and STA 4 connected to the AP 2 by wireless communication belong to the same BSS, and are referred to as a STA under the control of the AP 2.

Since the STA 2 and the STA 3 are close to APs other than a connection destination, it is assumed that the STA 2 and the STA 3 receive a signal transmitted from the APs other than the connection destination with strong reception power from the STA 1 and STA 4 far from the APs other than the connection destination.

Note that a target system configuration is not limited to the example of FIG. 1, and any configuration may be used as long as there is a plurality of the APs for which connection is established and the STAs are connected to the respective APs, as peripheral terminals.

RELATED ART

Figure 2:
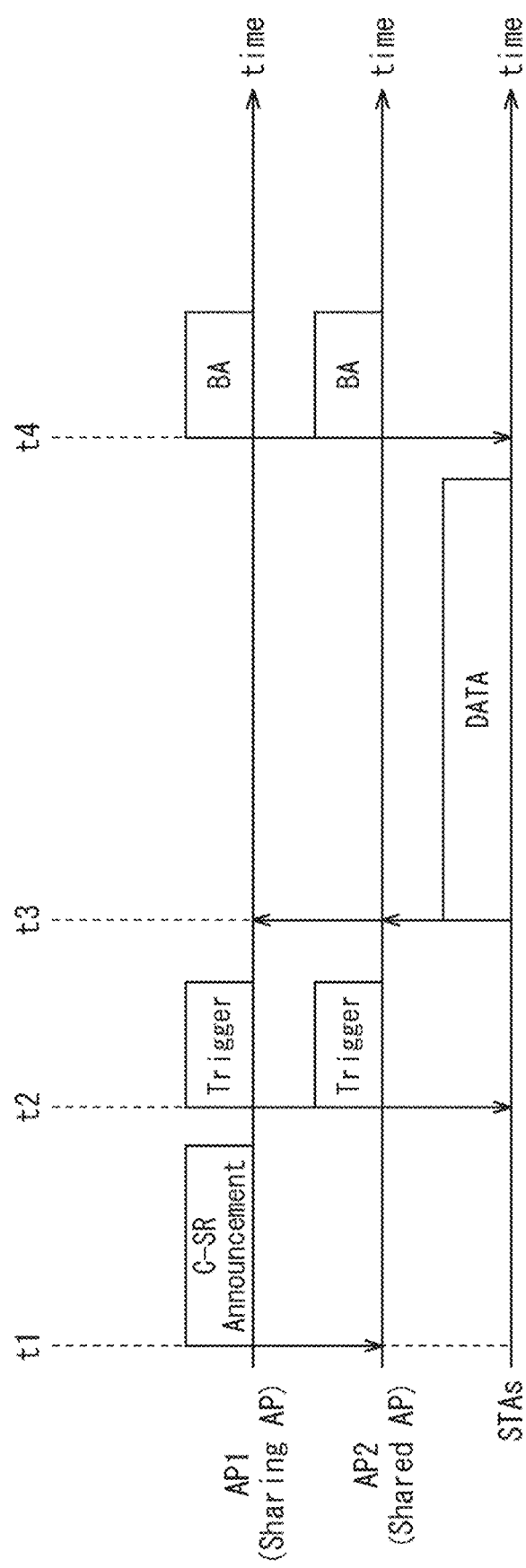
FIG. 2 is a diagram illustrating a basic sequence of C-SR at the time of UL transmission.

FIG. 2 is a diagram illustrating a basic sequence of C-SR at the time of UL transmission, which is the technology disclosed in Non-Patent Document 1.

Note that processing illustrated in FIG. 2 is processing performed by the AP 1, the AP 2, and the STAs. The STAs indicates at least one STA among the STA 1 to the STA 4.

In FIG. 2, the AP 1 is a sharing AP that acquires a transmission opportunity, and the AP 2 is a shared AP that receives permission of transmission from the AP 1. That is, the AP 2 is an AP that receives the transmission opportunity from the AP 1 in a sharing manner.

At time t1, the AP 1 transmits a C-SR announcement frame to the AP 2. The C-SR announcement frame includes an interference power value (referred to as an allowable interference power value) with which the AP 1 can secure sufficient communication quality in its own UL transmission and scheduling information of the AP 1. The scheduling information is information describing which resource is allocated to which STA under the control of the AP.

On the basis of the received C-SR announcement frame, the AP 2 determines UL scheduling including an STA triggered to perform UL transmission (to which a trigger frame is transmitted), a resource of the STA, transmission power, and a Modulation and Coding Scheme (MCS).

The UL scheduling is determined in the priority order of (1) an interference power value to be given to the AP 1 becomes equal to or less than the allowable interference power value, and (2) the AP 1 can acquire data by the UL transmission from the STA without any problem.

Thereafter, at time t2, each of the AP 1 and the AP 2 transmits a trigger frame that triggers the STA under the control of each of the AP 1 and the AP 2 to perform UL transmission. As described in IEEE 802.11ax/D6.0, the trigger frame includes a combination of STA triggered to perform UL transmission and resource information.

At time t3, each STA performs the UL transmission of DATA to the corresponding AP on the basis of the trigger frame.

After the UL transmission is completed, at time t4, the AP 1 and the AP 2 transmit a block ack frame (hereinafter, BA) that notifies the STAs under the control of the AP 1 and the AP2 of a reception state. The BA may be a Multi-STA Block Ack that stores response signals to a plurality of the STAs in the frame, and may be transmitted to a plurality of the STAs by using a DL OFDMA signal.

However, as described above, Non-Patent Document 1 does not describe a transmission method of DL control signals such as a trigger frame and a BA which are transmitted from the AP 1 and the AP 2. Currently, there are the following four transmission methods for the transmission method of a DL control signal such as the trigger frame or the BA.

<Transmission Method of DL Control Signal>

Figure 3:
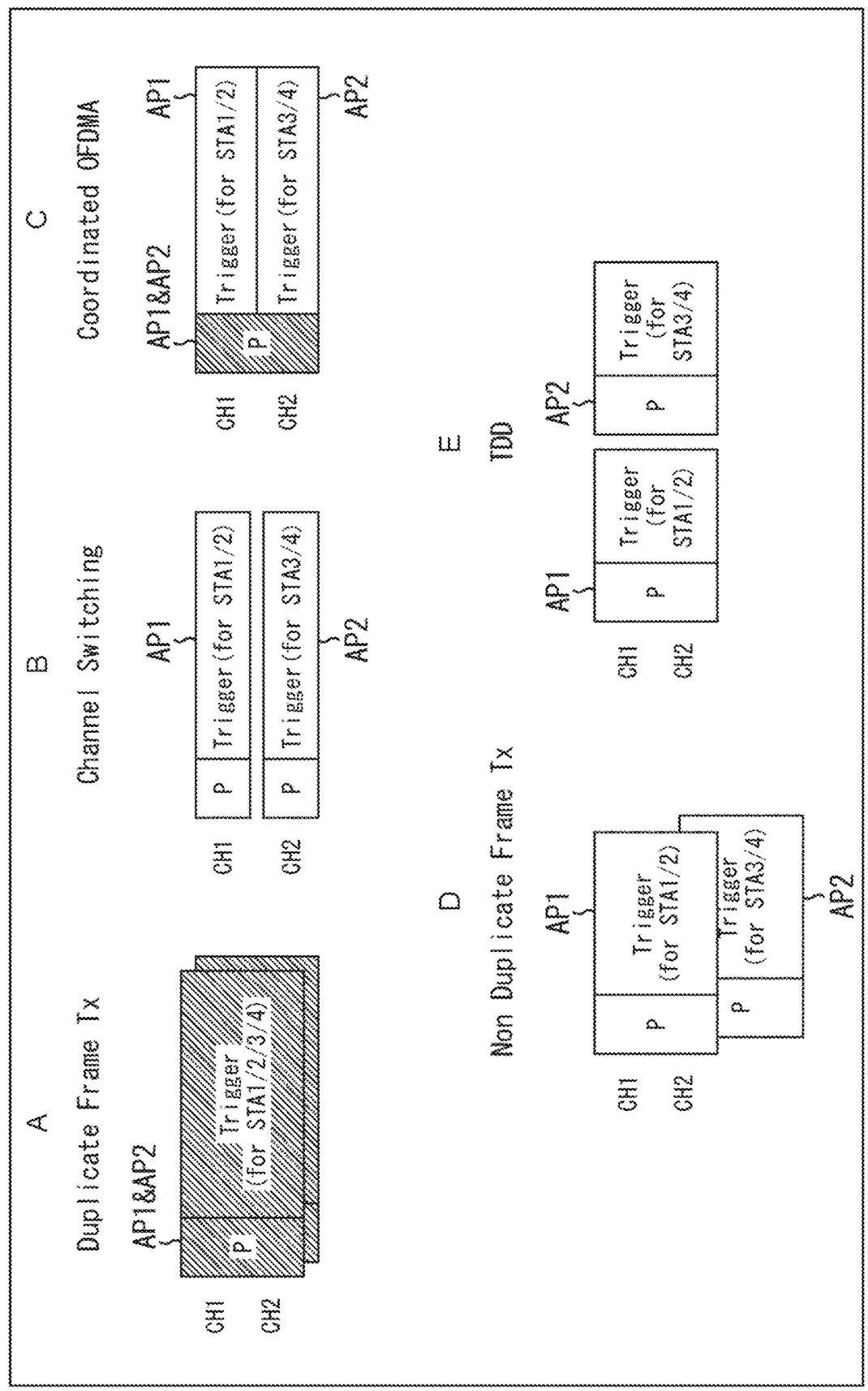
FIG. 3 is a diagram illustrating a transmission method of a DL control signal.

FIG. 3 is a diagram illustrating a transmission method of a DL control signal.

Note that, five transmission methods are illustrated in FIG. 3, but, since the trigger frame cannot perform time-division transmission due to a problem of time synchronization with the STAs at present, substantially four transmission methods are candidates for the transmission method of the DL control signal.

A of FIG. 3 illustrates a configuration example of a channel and frame used in a case where the transmission method of the DL control signal is Duplicate Frame Tx.

Duplicate Frame Tx is a transmission method in which the AP 1 and the AP 2 generate exactly the same frame and performs simultaneous transmission. A of FIG. 3 illustrates an example in which the AP 1 and the AP 2 simultaneously transmit exactly the same frame to the STA 1 to the STA 4 by using a plurality of channels of CH1 and CH2.

Since Duplicate Frame Tx is used for transmission of the DL control signal, it is possible to transmit the DL control signal to the STA without interference even when the same resources (channel, time information, and the like) are used.

Note that in Duplicate Frame Tx, transmission is easily performed in a wide band, but the APs have to hold the same information. Therefore, the use of Duplicate Frame Tx causes overhead for information exchange.

B of FIG. 3 illustrates a configuration example of a channel and a frame which are used in a case where the transmission method of the DL control signal is Channel Switching.

Channel switching is one of frequency multiplexing methods, and is a method in which one of the AP 1 and the AP 2 temporarily changes a primary channel (PCH) and transmits a DL control signal in a state in which a frequency is divided. In B of FIG. 3, an example is illustrated in which the AP 1 transmits a frame to the STA 1 and the STA 2 by using CH1 that is a PCH, and the AP 2 changes the PCH to CH2 and transmits the frame to the STA 3 and the STA 4 by using CH2.

Channel switching is used for transmission of the DL control signal, and thus signals can be reliably separated, but overhead for channel change occurs. Note that Channel Switching cannot be applied in a case where there is only 20 MHz of a channel that has acquired the transmission opportunity.

C of FIG. 3 illustrates a configuration example of a channel and a frame which are used in a case where the transmission method of the DL control signal is Coordinated OFDMA.

Coordinated OFDMA is one of frequency multiplexing methods, and is a transmission method of transmitting a DL control signal in a state in which a frequency is divided from a data unit after a preamble by using Coordinated OFDMA discussed in IEEE 802.11 be. In C of FIG. 3, an example is illustrated in which the AP 1 and the AP 2 transmit a preamble having the same configuration to the STA 1 to the STA 4 by using CH1 and CH2, after the preamble, the AP 1 transmits a frame to the STA 1 and the STA 2 by using CH1, and the AP 2 transmits a frame to the STA 3 and the STA 4 by using CH2.

By using Coordinated OFDMA for transmission of the DL control signal, it is possible to reliably separate signals, but it is necessary to transmit a synchronization signal (Multi-AP Trigger) for coordination transmission, and overhead occurs. Note that Coordinated OFDMA cannot be applied in a case where there is only 20 MHz of a channel that has acquired the transmission opportunity.

D of FIG. 3 illustrates a configuration example of a channel and a frame which are used in a case where the transmission method of the DL control signal is Non Duplicate Tx.

Non Duplicate Tx is a transmission method in which signals generated by the APs are simultaneously transmitted using the same resource. D of FIG. 3 illustrates an example in which the AP 1 transmits the generated frame to the STA 1 and the STA 2 by using a plurality of channels of CH1 and CH2, and at the same time, the AP 2 transmits the generated frame to the STA 3 and the STA 4 by using a plurality of channels of the same CH1 and CH2.

Non Duplicate Tx is the simplest method, but the signals interfere with each other, and thus it is not possible to obtain a guarantee that the STAs can correctly receive the signals.

E of FIG. 3 illustrates a configuration example of a channel and a frame which are used in a case where the transmission method of the DL control signal is Time Division Duplex (TDD).

TDD is a transmission method of transmitting signals generated by the APs in a time-division manner. E of FIG. 3 illustrates an example in which the AP 1 transmits the generated frame to the STA 1 and the STA 2 by using a plurality of channels of CH1 and CH2, and thereafter, the AP 2 transmits the generated frame to the STA 3 and the STA 4 by using a plurality of channels of the same CH1 and CH2.

Since the trigger frame is a mechanism in which the UL transmission is started after an SIFS period in which the trigger frame is received, currently, the trigger frame cannot be transmitted in a time-division manner.

Accordingly, when the four transmission methods excluding TDD are compared, a method with the least overhead, which is easily implemented, is Non Duplicate Tx illustrated in D of FIG. 3.

Certainly, it is conceivable that when the AP simultaneously transmits different frames, an interference signal is superimposed on a signal to be transmitted, and communication quality is deteriorated. However, in the DL control signal, a relatively low MCS is often set as compared with that at the time of data transmission, and there is a high possibility that the DL control signal can be allowed with a certain degree of interference.

However, there may be a situation in which interference cannot be allowed depending on a position of the STA from the AP and a transmission parameter. Therefore, the AP can implement UL C-SR transmission with less overhead by selectively using a plurality of the transmission methods described above according to the situation.

As described above, in the present technology, the sharing AP exchanges information with the shared AP before data transmission, and determines a transmission method of a DL control signal on the basis of the exchanged information. Note that the exchanged information is, for example, information necessary for the sharing AP to determine the transmission method, or transmission method information indicating a transmission method determined by the shared AP.

Hereinafter, examples of the present technology will be described separately for the first to third embodiments.

2. First Embodiment

In the first embodiment, an example in which the determining Party of the transmission method of the DL control signal is the sharing AP and the transmission parameter of the DL control signal can be adjusted for each AP will be described.

<Example of Entire Processing Sequence>

Figure 4:
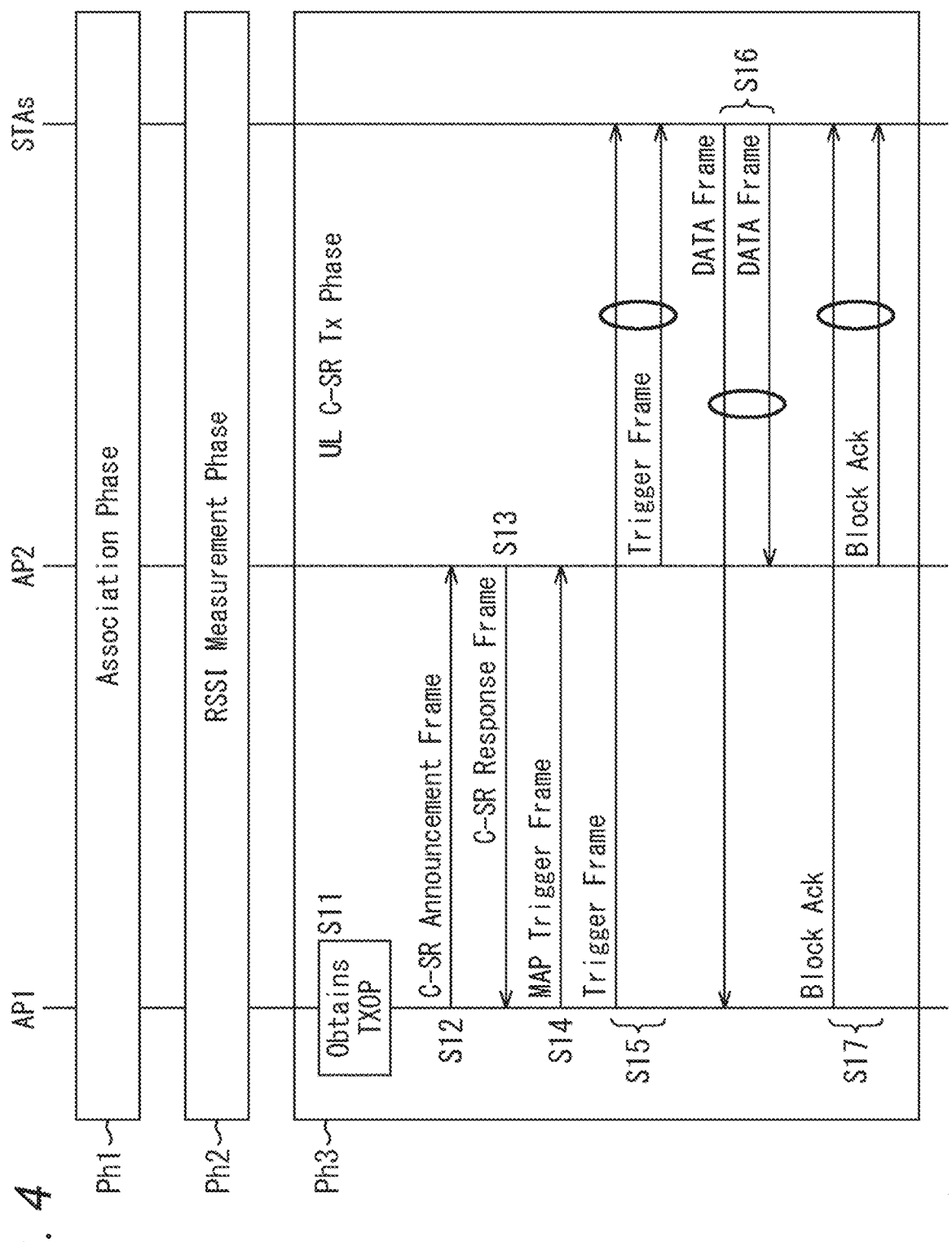
FIG. 4 is a diagram illustrating a sequence for describing entire processing of a wireless communication system.

FIG. 4 is a diagram illustrating a sequence for describing entire processing of the wireless communication system.

Note that processing illustrated in FIG. 4 is processing performed by the AP 1, the AP 2, and the STAs. The STAs represents the STA 1 to the STA 4.

The processing of the wireless communication system is divided into three phases of an association phase, an RSSI measurement phase, and an UL C-SR Tx phase.

A phase Ph1 is the association phase. In the association phase, connection processing between the AP and the STA in the same BSS and connection processing between the APs for coordination operation are performed. In the association phase, information of the STA in each BSS and capability information of each AP and each STA are exchanged between the APs.

A phase Ph2 is the RSSI measurement phase. In the RSSI measurement phase, RSSI information between the AP and the STA is measured, and a propagation loss value of each link is calculated. The link is, for example, a resource such as a frequency band. The measurement method is not particularly limited, and the STA may measure and feed back a signal transmitted from the AP, or the STA may transmit a signal and the AP may measure the signal. Furthermore, the AP may constantly measure the reception signal from each STA and calculate the propagation loss value from statistical information.

Note that the AP only needs to be capable of obtaining at least information indicating a propagation loss value with all the STAs of the AP, but may obtain the propagation loss information between another AP and the STA by exchanging information with the another AP.

A phase Ph3 is the UL C-SR Tx phase. In the UL C-SR Tx phase, the AP 1 exchanges information with the AP 2 before data transmission, a transmission method is determined on the basis of the exchanged information, and the trigger frame and the BA, which are DL control signals, are transmitted to the STA by the AP 1 and the AP 2 by the determined transmission method. At that time, the STA performs UL transmission to the AP 1 and the AP 2.

In FIG. 4, the phase Ph3 includes Steps S11 to S17.

In step S11, for example, after backoff, the AP 1 performs carrier sensing which is processing of detecting a carrier, and acquires a transmission opportunity on the basis of a carrier sensing result. In step S12, the AP 1 transmits a C-SR announcement frame which is a signal requesting the AP 2 to perform C-SR coordination transmission.

In step S13, the AP 2 transmits a C-SR response frame which is a response signal of the C-SR announcement frame.

Information is exchanged between the AP 1 and the AP 2 due to exchange between the C-SR announcement frame and the C-SR response frame, and the AP 1 determines the transmission method of the DL control signal on the basis of the phase Ph1, the phase Ph2, and the exchanged information. That is, the phase Ph1, the phase Ph2, and the information obtained by exchanging between the C-SR announcement frame and the C-SR response frame are information necessary for the sharing AP to determine the transmission method, and are used to determine the transmission method of the DL control signal.

In step S14, the AP 1 transmits, to the AP 2, a MAP trigger frame including information indicating the determined transmission method.

In step S15, the AP 1 and the AP 2 transmit the trigger frame to the STAs under the control of the AP 1 and the AP 2 by the determined transmission method on the basis of the MAP trigger frame.

In step S16, the STAs under the control of the AP 1 and the AP 2 perform UL transmission of the DATA frame to the AP 1 and the AP 2 on the basis of the received Trigger Frame.

In step S17, the AP 1 and the AP 2 transmit the BA to the STAs that have performed the UL transmission on the basis of the MAP trigger frame.

As described above, the UL C-SR Tx phase is executed. Note that the UL C-SR Tx phase is slightly different depending on the transmission method of the DL control signal, and will be described later in detail with reference to a flowchart.

<Frame Configuration Example of C-SR Announcement Frame>

Figure 5:
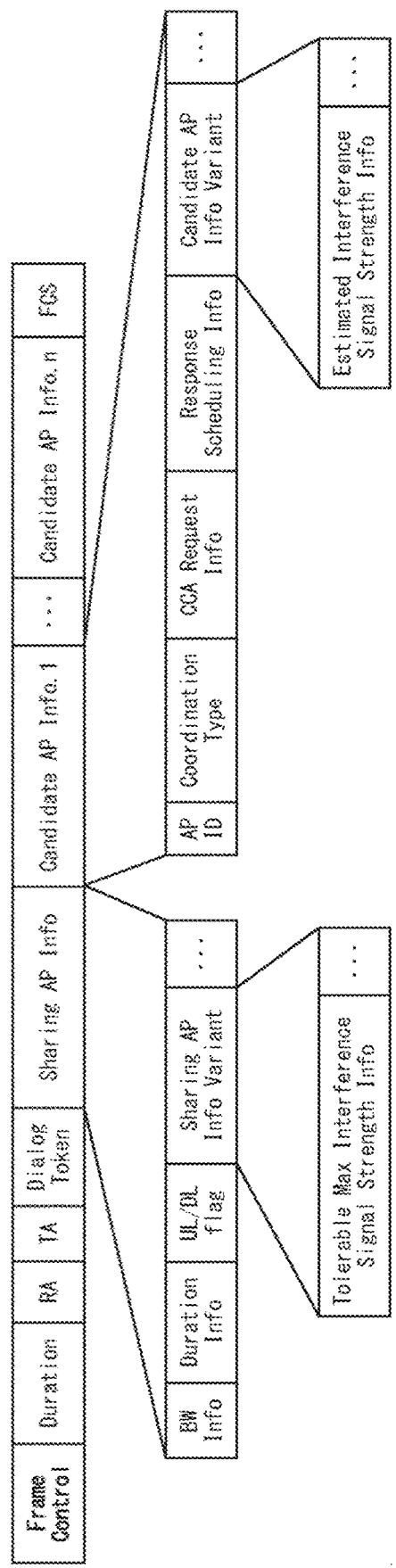
FIG. 5 is a diagram illustrating a frame configuration example of a C-SR announcement frame according to a first embodiment.

FIG. 5 is a diagram illustrating a frame configuration example of the C-SR announcement frame according to the first embodiment.

The C-SR announcement frame is a frame transmitted from the AP 1 to the AP 2 in step S12 of FIG. 4.

In FIG. 5, the C-SR announcement frame includes fields of Frame Control, Duration, RA, TA, Dialog Token, Sharing AP Info, Candidate AP Info.1, . . . , Candidate AP Info.n, and FCS.

The field of Frame Control includes information indicating that this Frame is a C-SR announcement frame. Note that the field of Frame Control includes information indicating that this frame is a frame for requesting coordination, and another field (for example, Coordination Type) may include information indicating that a coordination method is C-SR.

The field of Duration includes information indicating a transmission time of this frame.

The field of RA includes a transmission destination media access control (MAC) address of this frame. Normally, the transmission of this frame is broadcast transmission, but in a case where there is only one Candidate AP Info to be described later, the MAC address of the AP may be indicated.

The field of TA includes a transmission source MAC address of this frame. Normally, the field of TA includes a BSSID which is identification information of the BSS of the sharing AP.

The field of Dialog Token includes a token number of processing started by this frame.

The field of Sharing AP Info includes information regarding the sharing AP.

The field of Sharing AP Info includes sub fields of BW Info, Duration Info, UL/DL flag, and Sharing AP Info Variant.

The sub field of BW Info includes bandwidth information for which a transmission opportunity is acquired.

The sub field of Duration Info includes time information for which a transmission opportunity is acquired.

The sub field of UL/DL flag includes information indicating UL coordination or DL coordination.

The sub field of Sharing AP Info Variant includes information varying depending on the coordination method. In the case of C-SR, at least the sub field of Sharing AP Info Variant includes information of allowable interference power value (Tolerable Max Interference Signal Strength Info) in C-SR.

The field of Candidate AP Info includes information regarding a candidate of the AP as the shared AP.

The field of Candidate AP Info includes sub fields of AP ID, Coordination Type, CCA Request Info, Response Scheduling Info, and Candidate AP Info Variant.

The sub field of AP ID includes ID information of a candidate of the AP as the shared AP.

The sub field of Coordination Type includes a coordination method information. For example, in this specification, C-SR is specified.

The sub field of CCA Request Info includes information regarding whether or not to perform clear channel assessment (CCA) or channel information of CCA. CCA is synonymous with carrier sensing.

The sub field of Response Scheduling Info includes scheduling information of a C-SR response. For example, in a case where there is a plurality of candidate APs, the sharing AP allocates a resource to each AP such that the C-SR response frame is transmitted in OFDMA.

The sub field of Candidate AP Info Variant includes information varying depending on the coordination method. In the case of C-SR, at least Candidate AP Info Variant includes an estimation value (Estimated Interference Signal Strength Info) of interference power that the candidate AP will receive in the UL transmission received by the sharing AP.

The field of Frame Check Sequence (FCS) includes an error correction code.

<Frame Configuration Example of C-SR Response Frame>

Figure 6:
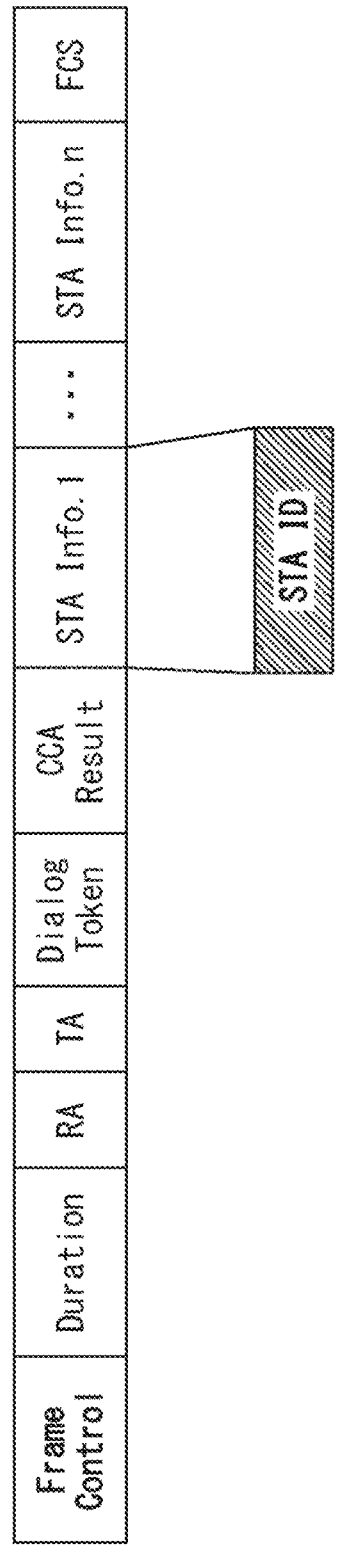
FIG. 6 is a diagram illustrating a frame configuration example of a C-SR response frame according to the first embodiment.

FIG. 6 is a diagram illustrating a frame configuration example of the C-SR response frame according to the first embodiment.

Note that hatching in FIG. 6 indicates a field including information which is a characteristic of the present technology. The same applies to subsequent drawings in the first embodiment.

The C-SR response frame is a frame transmitted from the AP 2 to the AP 1 in step S13 of FIG. 4.

In FIG. 6, the C-SR response frame includes fields of Frame Control, Duration, RA, TA, Dialog Token, CCA Result, STA Info1, . . . STA Info n, and FCS.

The field of Frame Control includes information indicating that this Frame is a C-SR response frame. Note that the field of Frame Control includes information indicating that this frame is a frame for responding to a coordination request, and another field may include information indicating that a coordination method is C-SR.

The field of Duration includes information indicating a transmission time of this frame.

The field of RA includes a transmission source MAC address of this frame. Normally, the field of RA includes a BSSID which is identification information of the BSS of the sharing AP.

The field of TA includes a transmission source MAC address of this frame. Normally, the field of TA includes a BSSID which is identification information of the BSS of the shared AP.

The field of Dialog Token includes a token number of processing that this frame responds.

The field of CCA Result includes a result of the CCA (carrier sensing result). The field of CCA Result includes a result obtained by performing CCA on each channel in response to a CCA request requested from the sharing AP. For example, in a case where CCA for CH1 to CH4 is requested by the CCA request, the shared AP provides notification of each channel of an idle state "one" and a busy state "zero".

Specifically, the sharing AP determines whether or not there is a possibility of frequency multiplexing on the basis of the CCA result of the shared AP. For example, in a case where a primary CH is set to CH1 in both the sharing AP and the shared AP, when the CH1 and the adjacent CH2 are idle in both the sharing AP and the shared AP, the sharing AP and the shared AP is determined to perform C-OFDMA by using the CH1 and the CH2.

In a case where both the sharing AP and the shared AP set the primary CH to CH1, when the CH1 and the adjacent CH2 are idle in the sharing AP and only the CH1 is idle in the shared AP, the sharing AP is determined to temporarily perform channel switching to the CH2.

In a case where both the sharing AP and the shared AP set the primary CH to CH1, when only the CH1 is idle in the sharing AP and the CH1 and the adjacent CH2 are idle in the shared AP, the shared AP is determined to temporarily perform channel switching to the CH2.

In a case where both the sharing AP and the shared AP set the primary CH to CH1, when only the CH1 is idle in both the sharing AP and the shared AP, it is determined that frequency multiplexing is impossible.

The field of each STA Info includes information regarding the STA that is triggered to performs the UL transmission by the APs. In the present specification, this field is only required to include at least STA ID information.

The field of FCS includes an error correction code.

<Frame Configuration Example of MAP Trigger Frame>

Figure 7:
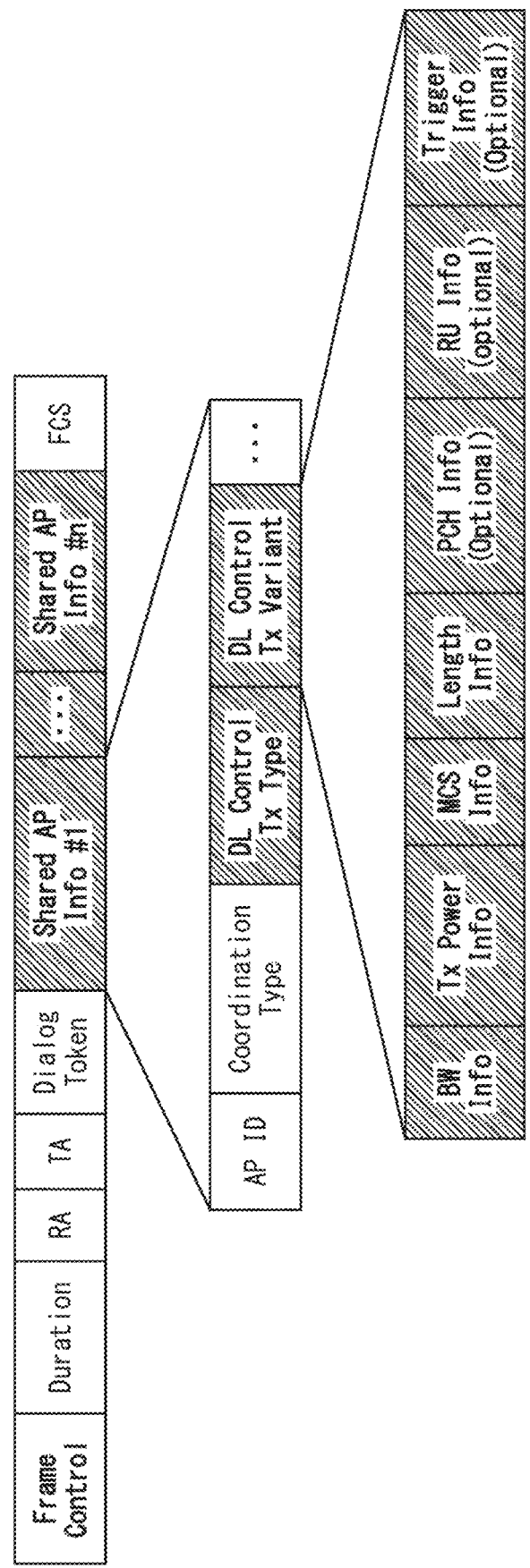
FIG. 7 is a diagram illustrating a frame configuration example of a MAP trigger frame.

FIG. 7 is a diagram illustrating a frame configuration example of the MAP trigger frame.

The MAP trigger frame is a frame transmitted from the AP 1 to the AP 2 in step S14 of FIG. 4.

In FIG. 7, the MAP trigger frame includes fields of Frame Control, Duration, RA, TA, Dialog Token, Shared AP Info #1, . . . Shared AP Info #n, and FCS.

The field of Frame Control includes information indicating that this Frame is a MAP trigger frame.

The field of Duration includes information indicating a transmission time of this frame.

The field of RA includes a transmission source MAC address of this frame. Normally, the field of RA includes a BSSID which is identification information of the BSS of the shared AP.

The field of TA includes a transmission source MAC address of this frame. Normally, the field of TA includes a BSSID which is identification information of the BSS of the sharing AP.

The field of Dialog Token includes a token number of processing that this frame responds.

The field of each Sharing AP Info includes information regarding the shared AP requesting coordination.

The field of Shared AP Info includes sub fields of AP ID, Coordination Type, DL Control Tx Type, and DL Control Tx Variant.

The field of AP ID includes ID information of the shared AP.

The field of Coordination Type includes information regarding a coordination method.

The field of DL Control Tx Type includes information regarding a transmission method of a DL control signal (only at the time of UL transmission).

The field of DL Control Tx Variant includes information corresponding to the transmission method of the DL control signal. That is, the type of information to be included varies depending on the transmission method of the DL control signal.

For example, the field of DL Control Tx Variant includes bandwidth information (BW Info) of the DL control signal, transmission power information (Tx Power Info), MCS information (MCS Info), frame length information (Length Info), transmission channel information (PCH Info), resource information (RU Info), and information (Trigger Info) of the trigger frame to be transmitted by the APs.

Note that the some of the above-described information included in the field of DL Control Tx Variant may be transmitted as Common Info in a form in which only one field is provided in the frame separately from Shared AP Info.

Furthermore, Trigger Info includes both Common Info/ User Info of IEEE 802.11ax/Trigger Frame.

The field of FCS includes an error correction code.

<Configuration Example of Wireless Communication Device>

Figure 8:
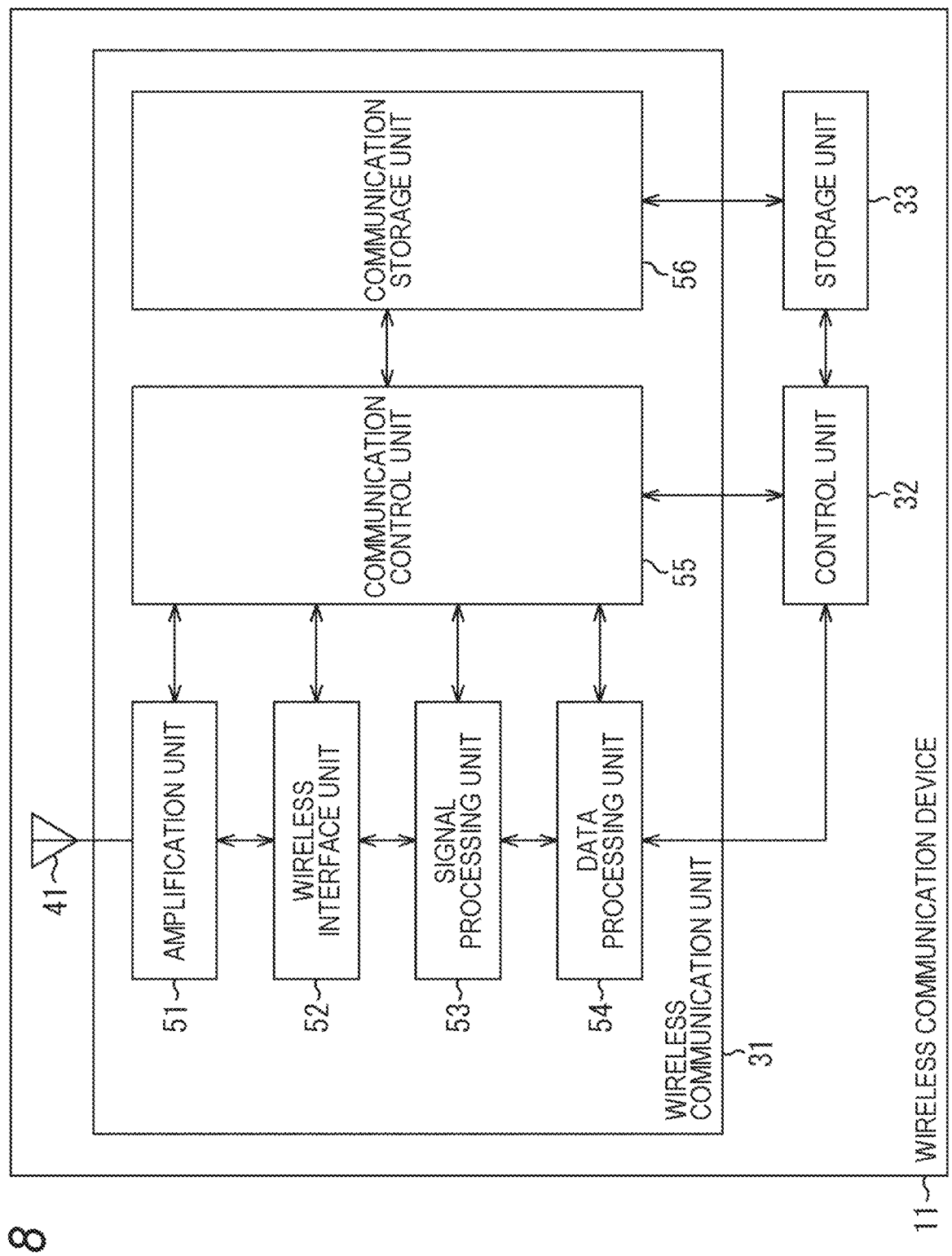
FIG. 8 is a block diagram illustrating a configuration example of a wireless communication device.

FIG. 8 is a block diagram illustrating a configuration example of the wireless communication device.

A wireless communication device 11 illustrated in FIG. 8 is a wireless communication device that operates as an AP (sharing AP or shared AP).

The wireless communication device 11 includes a wireless communication unit 31, a control unit 32, a storage unit 33, and an antenna 41.

The wireless communication unit 31 transmits and receives data. The wireless communication unit 31 includes an amplification unit 51, a wireless interface unit 52, a signal processing unit 53, a data processing unit 54, a communication control unit 55, and a communication storage unit 56.

At the time of transmission, the amplification unit 51 amplifies an analog signal supplied from the wireless interface unit 52 to predetermined power, and outputs the analog signal obtained by amplifying the power to the antenna 41. At the time of reception, the amplification unit 51 amplifies an analog signal supplied from the antenna 41 to predetermined power, and outputs the analog signal obtained by amplifying the power to the wireless interface unit 52.

Some of functions of the amplification unit 51 may be included in the wireless interface unit 52. Furthermore, some of functions of the amplification unit 51 may be configured as a component other than the wireless communication unit 31.

At the time of transmission, the wireless interface unit 52 converts a transmission symbol stream from the signal processing unit 53 into an analog signal, performs filtering, up-conversion into a carrier frequency, and phase control, and outputs the analog signal after the phase control to the amplification unit 51.

At the time of reception, the wireless interface unit 52 performs phase control, down-conversion, and inverse filtering on the analog signal supplied from the amplification unit 51, and outputs, to the signal processing unit 53, a reception symbol stream as a result of conversion into a digital signal.

At the time of transmission, as necessary, the signal processing unit 53 performs signal processing for spatial separation on a data symbol stream supplied from the data processing unit 54, and outputs one or more transmission symbol streams obtained by the signal processing to each wireless interface unit 52.

At the time of reception, the signal processing unit 53 performs signal processing on the reception symbol stream supplied from each wireless interface unit 52, performs spatial separation of the stream as necessary, and outputs the data symbol stream obtained by the spatial separation to the data processing unit 54.

At the time of transmission, the data processing unit 54 performs sequence management of data held in the communication storage unit 56, and control information and management information received from the communication control unit 55. Furthermore, the data processing unit 54 generates a data unit by performing encryption processing on the control information and the management information, and performs addition of a MAC header and addition of an error detection code with respect to the generated data unit, and performs a plurality of connection processing on the data unit.

The data processing unit 54 releases connection with the MAC header of the received data unit, performs analysis and error detection, and performs retransmission request reorder processing.

The communication control unit 55 controls operation of each unit of the wireless communication unit 31 and information transmission between the units. Furthermore, the communication control unit 55 performs control to transfer control information and management information notification of which is provided to another communication device to the data processing unit 54.

In the present technology, the communication control unit 55 exchanges information between the APs, and determines a transmission method of a DL control signal on the basis of the exchanged information.

The communication storage unit 56 holds information used by the communication control unit 55. Furthermore, the communication storage unit 56 holds data to be transmitted and received data.

The control unit 32 includes a central processing unit (CPU), a read only memory (ROM), and a random access memory (RAM). The control unit 32 executes a program stored in the ROM or the like, and controls the wireless communication unit 31 and the communication control unit 55. Furthermore, the control unit 32 may perform a part of operation of the communication control unit 55 instead. Furthermore, the communication control unit 55 and the control unit 32 may be configured as one block.

The storage unit 33 holds information used by the wireless communication unit 31 and the control unit 32. Furthermore, the storage unit 33 may perform a part of the operation of the communication storage unit 56 instead. The storage unit 33 and the communication storage unit 56 may be configured as one block.

Note that the wireless communication unit 31 is realized by one or more ICs, but the IC configuration of the present technology is not limited to this. For example, the wireless interface unit 52 may be configured as another IC.

<Processing of Each AP in C-SR Tx Phase>

Figure 9:
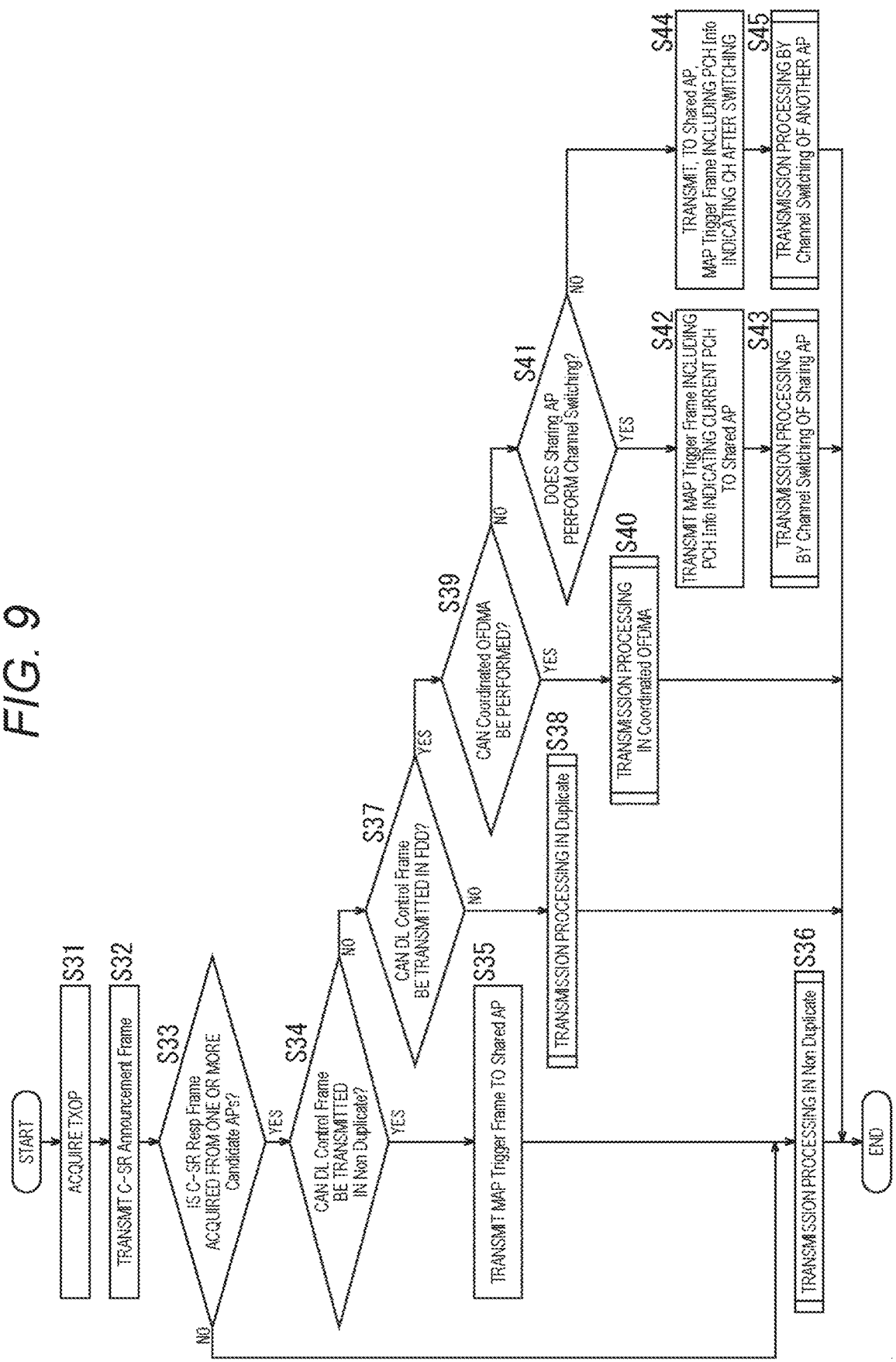
FIG. 9 is a flowchart illustrating processing of a sharing AP (AP 1) according to the first embodiment.

FIG. 9 is a flowchart illustrating processing of the sharing AP (AP 1) according to the first embodiment.

In step S31, the AP 1 acquires a transmission opportunity (TXOP) (step S11 in FIG. 4).

In step S32, the AP 1 as the sharing AP transmits a C-SR announcement frame (step S12 in FIG. 4). Hereinafter, a subject will be described as the sharing AP.

In step S33, the sharing AP determines whether or not the C-SR response frame is acquired from one or more candidate APs. In a case where it is determined in step S33 that the C-SR response frame is acquired from one or more candidate APs, the processing proceeds to step S34.

Here, the shared AP is selected from among the candidate APs (AP2) that have transmitted the C-SR response frame.

In step S34, the sharing AP determines whether or not Non Duplicate transmission of the DL control signal (DL control frame) can be performed on the basis of the C-SR response frame.

For example, in a case where all the APs simultaneously transmit the DL control signal, when a signal to interference and noise ratio (SINR) of all the STAs triggered to perform the UL transmission in Trigger satisfy an allowable value, it is determined in step S34 that the DL control signal can be transmitted in Non Duplicate.

Note that the allowable value is a SINR value securing a packet error rate (PER) equal to or lower than a certain value for the MCS. The SINR of all the STAs triggered to perform the UL transmission in Trigger are acquired, for example, in the phase Ph2 in FIG. 4.

Furthermore, at this time, the sharing AP may adjust a transmission parameter such as the transmission power value or the MCS of each AP to satisfy the above-described allowable value. At that time, notification of the adjusted transmission parameter is provided as a MAP trigger frame to each shared AP in step S35 described later.

In step S34, in a case where it is determined that the DL control signal can be transmitted in Non Duplicate, the processing proceeds to step S35.

In step S35, the sharing AP transmits the MAP trigger frame to the shared AP (step S14 in FIG. 4). Thereafter, the processing proceeds to step S36.

Furthermore, in step S33, in a case where it is determined that the C-SR response frame is not acquired from one or more candidate APs, the processing proceeds to step S36.

In step S36, the sharing AP performs transmission processing in Non Duplicate. The transmission processing in Non Duplicate will be described later with reference to FIG. 10. With this processing, the sharing AP transmits the DL control signal in coordination with the shared AP in Non Duplicate, and receives the UL Data frame from the STA. Note that the term "Non Duplicate" as used herein includes a case where the shared AP does not exist, and only the AP 1 transmits the trigger frame.

In step S34, in a case where it is determined that the DL control signal cannot be transmitted in Non Duplicate, the processing proceeds to step S37.

In step S37, the sharing SP determines whether or not the DL control signal can be transmitted in frequency division duplex (FDD), that is, by a frequency multiplexing method.

For example, in a case where the sharing AP has not acquired a transmission opportunity in a bandwidth of 40 MHz or more, it is determined in step S37 that the DL control signal cannot be transmitted in FDD, and the processing proceeds to step S38.

In step S38, the sharing AP performs transmission processing in Duplicate. The transmission processing in Duplicate will be described later with reference to FIG. 11. With this processing, the sharing AP transmits the DL control signal in coordination with the shared AP in Duplicate, and receives the UL Data frame from the STA.

In step S37, in a case where it is determined that the DL control signal can be transmitted in FDD, the processing proceeds to step S39.

In step S39, the sharing AP determines whether or not Coordinated OFDMA is possible. Capability information acquired in the phase Ph1 in FIG. 4, CCA Result of the C-SR response frame, and the like are used for this determination.

For example, in a case where Coordinated OFDMA can be performed for both the sharing AP and the shared AP with the capability information acquired in the phase Ph1 in FIG. 4, it is determined in step S37 that Coordinated OFDMA can be performed, and the processing proceeds to step S40.

In step S40, the sharing AP performs transmission processing in Coordinated OFDMA. The transmission processing in Coordinated OFDMA will be described later with reference to FIG. 12. With this processing, the sharing AP transmits the DL control signal in coordination with the shared AP in Coordinated OFDMA, and receives the UL Data frame from the STA.

In step S39, in a case where it is determined that Coordinated OFDMA cannot be performed, the processing proceeds to step S41.

In step S41, the sharing AP determines whether or not to perform channel switching.

For example, on the basis of the CCA result of the C-SR response frame, in a case where the primary channel (PCH) of the shared AP is in "Busy" state, it is determined in step S41 that the AP performs channel switching, and the processing proceeds to step S42.

In step S42, the sharing AP transmits, to the shared AP, the MAP trigger frame including PCH Info indicating a current PCH.

In step S43, the sharing AP performs transmission processing by channel switching of the sharing AP. The transmission processing by channel switching of the sharing AP will be described later with reference to FIG. 13. With this processing, the sharing AP transmits the DL control signal in coordination with the shared AP by channel switching of the sharing AP, and receives the UL Data frame from the STA.

For example, on the basis of the CCA result of the C-SR response frame, in a case where the primary channel of the shared AP is in "Busy" state, it is determined in step S41 that the AP does not perform channel switching, and the processing proceeds to step S44.

In step S44, the sharing AP transmits, to the shared AP, the MAP trigger frame including PCH Info indicating a PCH after switching.

In step S45, the sharing AP performs transmission processing by channel switching of another AP (in this case, shared AP). The transmission processing by channel switching of another AP will be described later with reference to FIG. 14. With this processing, the sharing AP transmits the DL control signal in coordination with the shared AP by channel switching of the shared AP, and receives the UL Data frame from the STA.

After Steps S36, S38, S40, S43, or S45, the processing of FIG. 9 ends.

Figure 10:
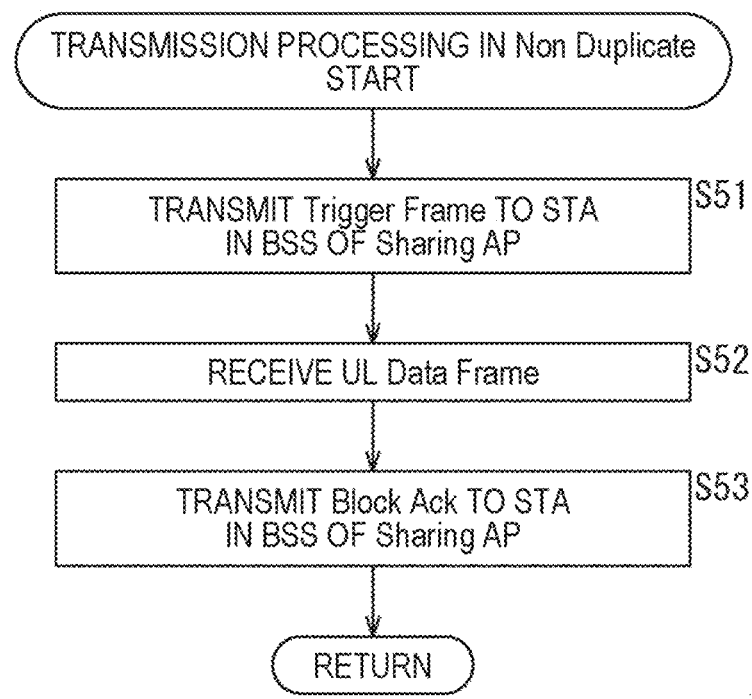
FIG. 10 is a flowchart illustrating transmission processing in Non Duplicate in step S36 of FIG. 9.

FIG. 10 is a flowchart illustrating transmission processing in Non Duplicate in step S36 of FIG. 9.

In step S51, the sharing AP transmits the trigger frame to the STA in the BSS of the sharing AP (step S15 in FIG. 4).

The STA specified by the trigger frame transmits the UL Data frame (step S16 in FIG. 4).

In step S52, the sharing AP receives the UL Data frame transmitted from the STA.

In step S53, the sharing AP transmits the BA to the STA in the BSS of the sharing AP.

Figure 11:
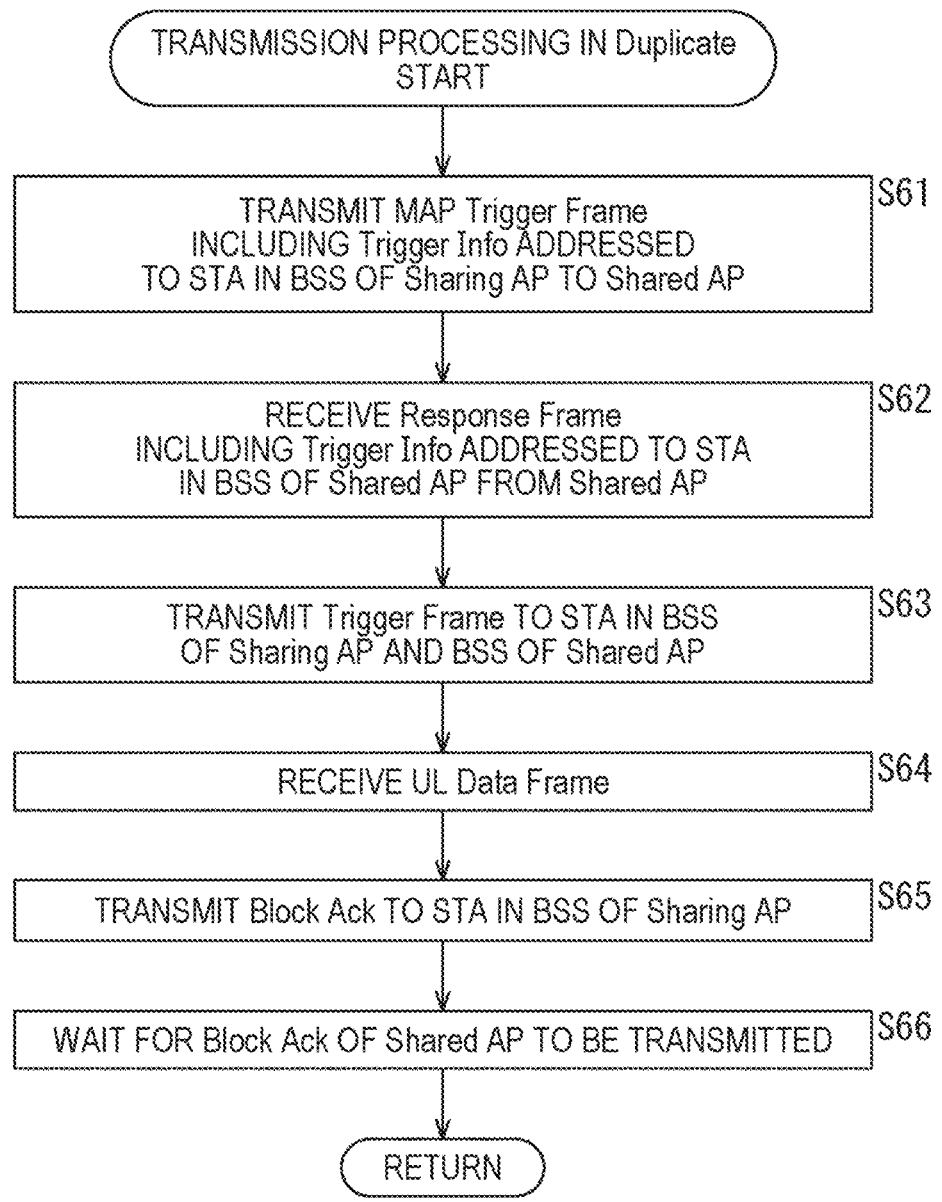
FIG. 11 is a flowchart illustrating transmission processing in Duplicate in step S38 of FIG. 9.

FIG. 11 is a flowchart illustrating transmission processing in Duplicate in step S38 of FIG. 9.

In the case of transmission in Duplicate, it is necessary to synchronize the information of the trigger frame between the APs, and thus the sharing AP needs to acquire Trigger Info from the shared AP. Therefore, in step S61, the sharing AP transmits, to the shared AP, the MAP trigger frame including Trigger Info addressed to the STA in the BSS of the sharing AP (step S14 in FIG. 4).

In step S62, the sharing AP receives a response frame including Trigger Info addressed to the STA in the BSS of the shared AP from the shared AP.

In step S63, the sharing AP transmits a trigger frame including information regarding all the STAs triggered to perform the UL transmission to the STAs in the BSS of the sharing AP and the BSS of the shared AP (step S15 in FIG. 4).

The STA specified by the trigger frame transmits the UL Data frame (step S16 in FIG. 4).

In step S64, the sharing AP receives the UL Data frame transmitted from the STA.

In step S65, the sharing AP transmits the BA to the STA in the BSS of the sharing AP (step S17 in FIG. 4).

In step S66, the sharing AP waits the BA of the shared AP to be transmitted.

Note that, since it is difficult for the APs to share the information of the current BA at the time of duplicate transmission, an example in which only the BA is transmitted in TDD has been described here, but the BA may be transmitted as a duplicate frame similarly to the trigger frame.

Figure 12:
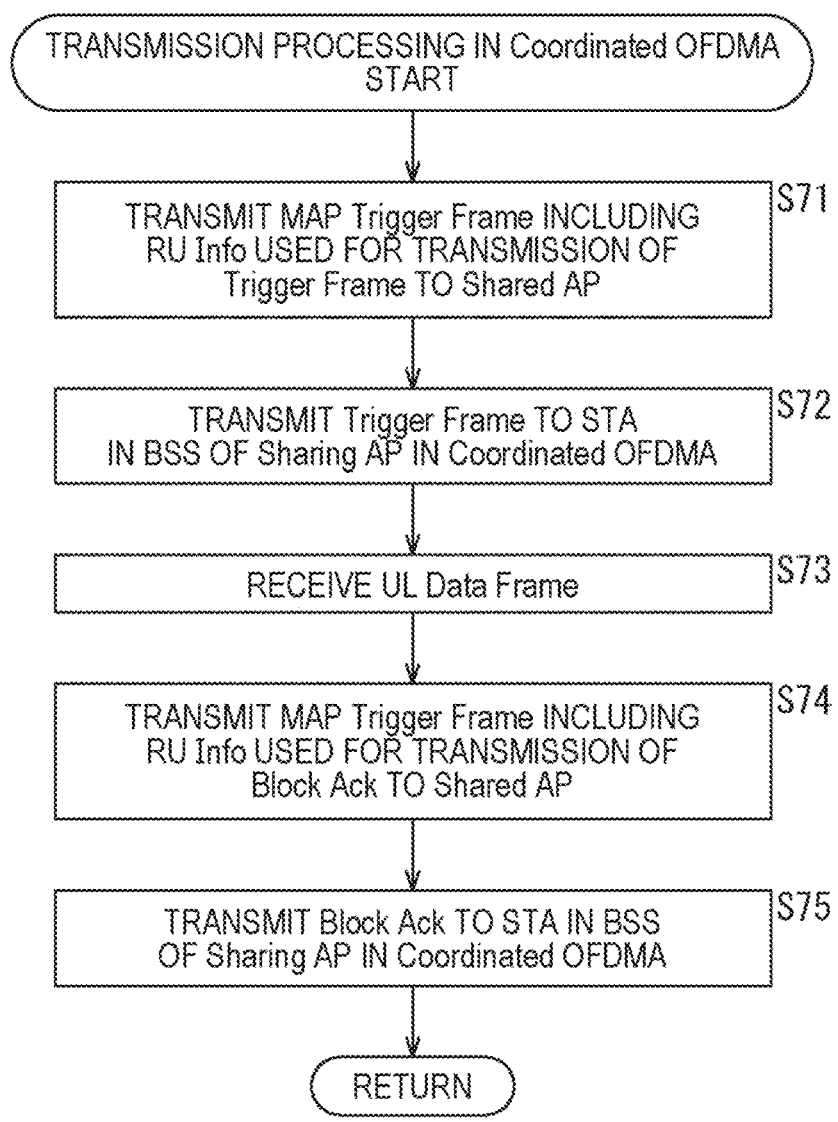
FIG. 12 is a flowchart illustrating transmission processing in Coordinated OFDMA in step S40 of FIG. 9.

FIG. 12 is a flowchart illustrating transmission processing in Coordinated OFDMA in step S40 of FIG. 9.

In the case of Coordinated OFDMA transmission, in order to establish synchronization with the shared AP, the sharing AP transmits the MAP trigger even before the transmission of the BA.

In step S71, the sharing AP transmits the MAP trigger frame including RU Info which is resource information used for transmission of the trigger frame (step S14 in FIG. 4).

In step S72, the sharing AP transmits the trigger frame to the STA in the BSS of the sharing AP in Coordinated OFDMA (step S15 in FIG. 4).

In step S73, the sharing AP receives the UL Data frame.

In step S74, the sharing AP transmits, to the shared AP, the MAP trigger frame including RU Info used for transmission of the BA.

In step S75, the sharing AP transmits the BA to the STA in the BSS of the sharing AP in Coordinated OFDMA (step S17 in FIG. 4).

Figure 13:
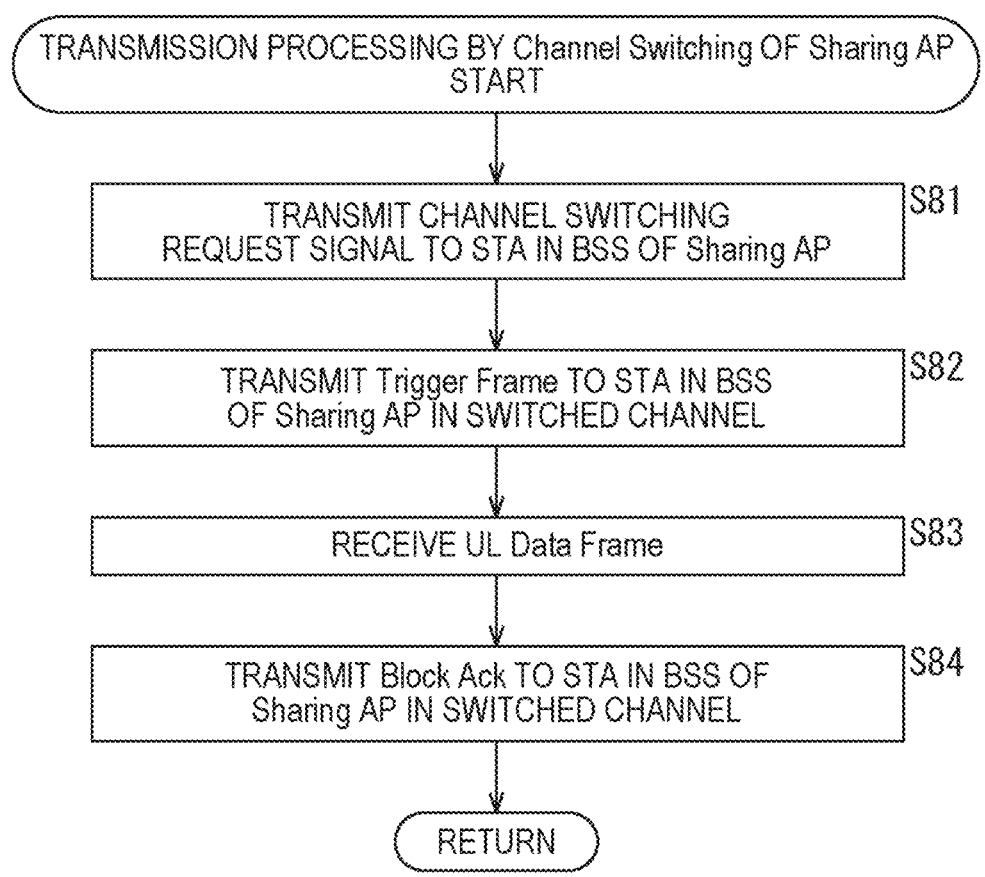
FIG. 13 is a flowchart illustrating transmission processing by channel switching of a sharing AP in step S43 of FIG. 9.

FIG. 13 is a flowchart illustrating transmission processing by channel switching of the sharing AP in step S43 of FIG. 9.

In the case of transmission by channel switching, after transmission of the MAP trigger, either the sharing AP or the shared AP transmits a channel switching request signal indicating channel switching to STAs under the control of the APs, and then transmits a trigger frame for triggering the UL transmission. Note that the channel switching request signal may be included in the MAP trigger.

In step S81, the sharing AP transmits the channel switching request signal to the STA in the BSS of the sharing AP.

In step S82, the sharing AP transmits the trigger frame to the STA in the BSS of the sharing AP in a switched channel (step S15 in FIG. 4).

In step S83, the sharing AP receives the UL Data frame.

In step S84, the sharing AP transmits the BA to the STA in the BSS of the sharing AP in the switched channel (step S17 in FIG. 4).

Figure 14:
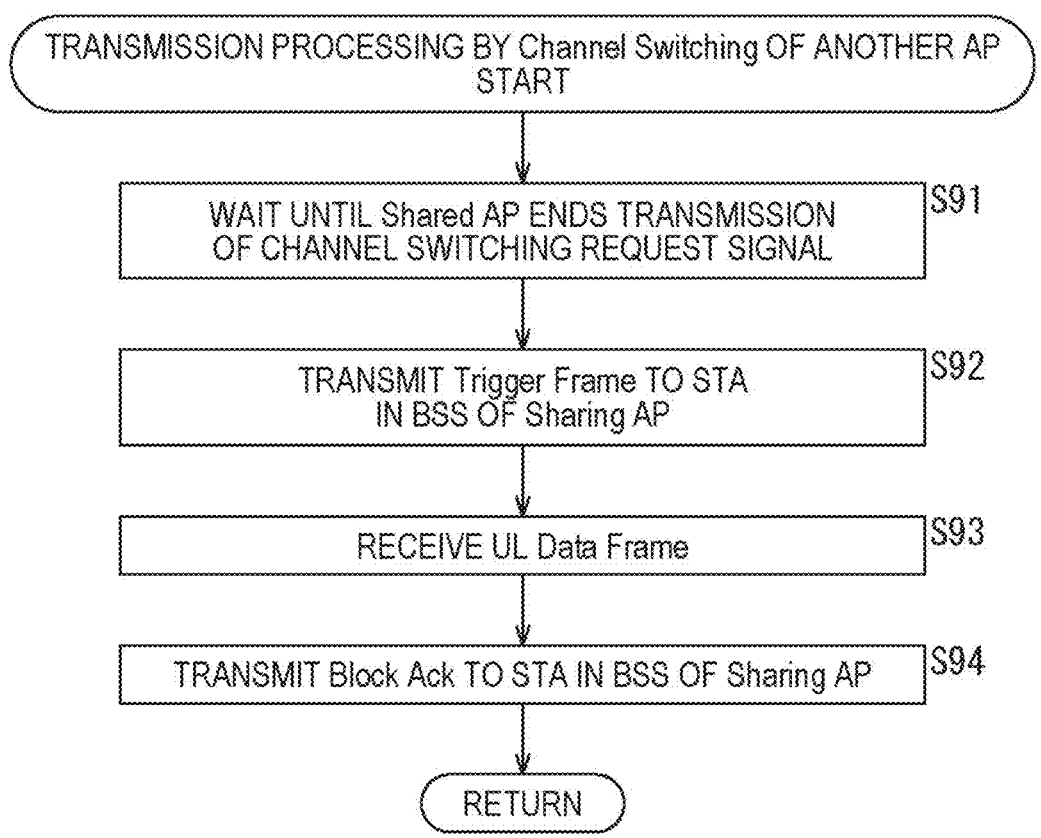
FIG. 14 is a flowchart illustrating transmission processing for channel switching of another AP in step S45 of FIG. 9.

FIG. 14 is a flowchart illustrating transmission processing by channel switching of another AP in step S45 of FIG. 9.

In step S91, the sharing AP waits until the shared AP ends transmission of the channel switching request signal.

In step S92, the sharing AP transmits the trigger frame to the STA in the BSS of the sharing AP (step S15 in FIG. 4).

In step S93, the sharing AP receives the UL Data frame.

In step S94, the sharing AP transmits the BA to the STA in the BSS of the sharing AP in the switched channel (step S17 in FIG. 4).

Figure 15:
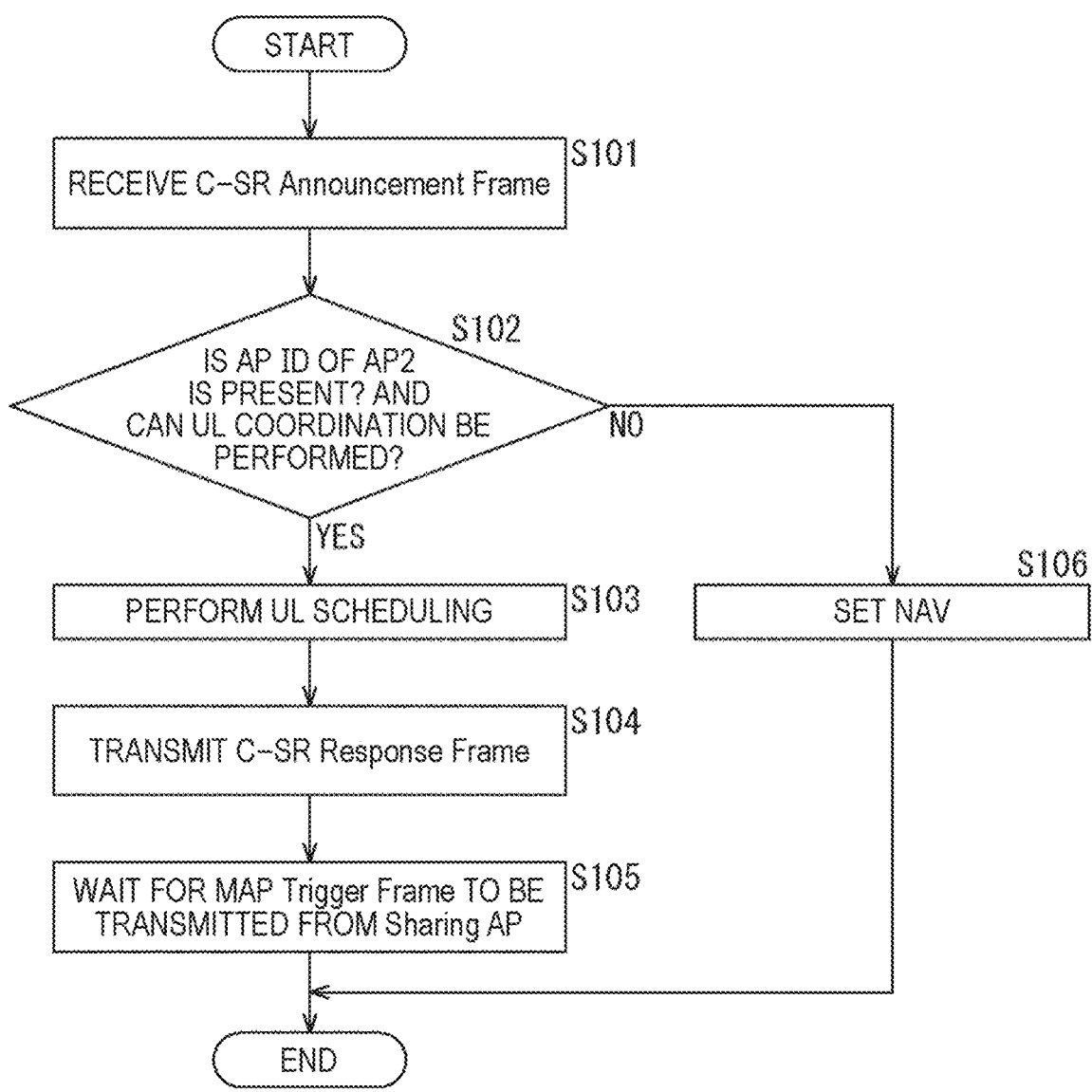
FIG. 15 is a flowchart illustrating processing of a shared AP (AP 2) according to the first embodiment.

FIG. 15 is a flowchart illustrating processing of a shared AP (AP 2) according to the first embodiment.

Note that the processing in FIG. 15 is processing at the time of receiving the C-SR announcement frame transmitted in step S12 of FIG. 4.

In step S101, the AP 2 receives the C-SR announcement frame.

In step S102, the AP 2 determines whether or not AP ID of the AP2 is present and whether or not UL coordination can be performed on the basis of the C-SR announcement frame. In a case where it is determined in step S102 that the AP ID of the AP2 is present and the UL coordination can be performed, the processing proceeds to step S103.

In step S103, the AP 2 as the shared AP performs UL scheduling. The UL scheduling is processing of allocating a resource to the STA and processing of setting a transmission power value so as to be equal to or less than an allowable interference power value of the sharing AP. Hereinafter, a subject will be described as the shared AP.

In step S104, the shared AP transmits the C-SR response frame.

In step S105, the shared AP waits the MAP trigger frame to be transmitted from the sharing AP.

In step S102, in a case where it is determined that the AP ID of the shared AP is not present or the UL coordination cannot be performed, the processing proceeds to step S106.

In step S106, the AP 2 sets a network allocation vector, transmission prohibition period (NAV).

After Steps S105 or S106, the processing of FIG. 15 ends.

Figure 16:
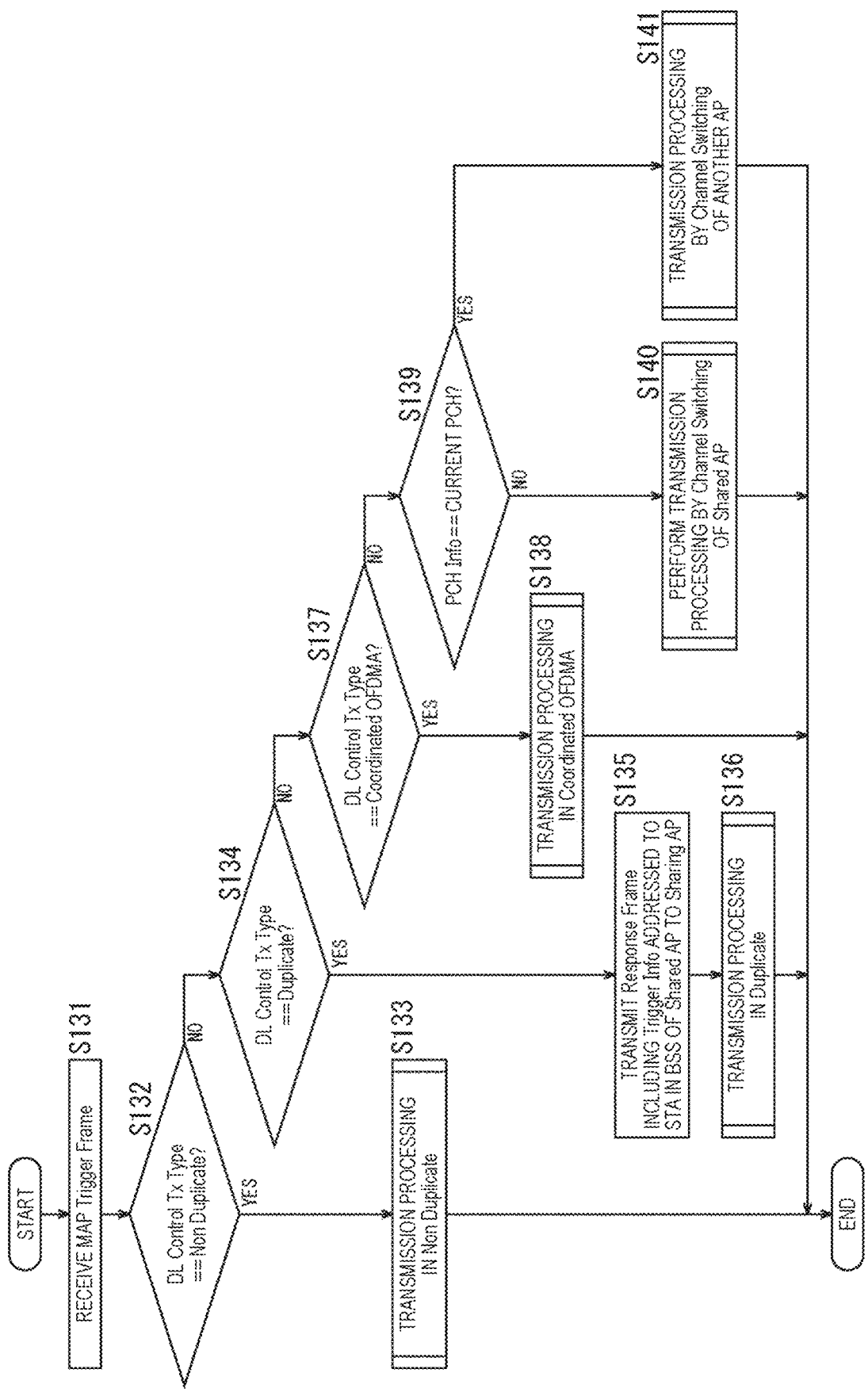
FIG. 16 is a flowchart illustrating processing of a shared AP (AP 2) according to the first embodiment.

FIG. 16 is a flowchart illustrating processing of the shared AP (AP 2) according to the first embodiment.

Note that the processing in FIG. 16 is processing at the time of receiving the MAP trigger frame transmitted in step S14 of FIG. 4.

In step S131, the shared AP receives the MAP trigger frame.

In step S132, the shared AP determines whether or not DL Control Tx Type included in the MAP trigger frame is Non Duplicate. In a case where it is determined in step S132 that DL Control Tx Type is Non Duplicate, the processing proceeds to step S133.

In step S133, the shared AP performs transmission processing in Non Duplicate. The transmission processing in Non Duplicate is processing similar to the processing described above with reference to FIG. 10. With this processing, the shared AP transmits the DL control signal in coordination with the sharing AP in Non Duplicate, and receives the UL Data frame from the STA.

In step S132, in a case where it is determined that DL Control Tx Type is not Non Duplicate, the processing proceeds to step S134.

In step S134, the shared AP determines whether or not DL Control Tx Type is Duplicate. In a case where it is determined in step S134 that DL Control Tx Type is Duplicate, the processing proceeds to step S135.

In step S135, the shared AP transmits, to the sharing AP, the response frame including Trigger Info addressed to the STA in the BSS of the shared AP.

In step S136, the shared AP performs transmission processing in Duplicate. The transmission processing in Duplicate will be described later with reference to FIG. 17. With this processing, the shared AP transmits the DL control signal in coordination with the sharing AP in Duplicate, and receives the UL Data frame from the STA.

In step S134, in a case where it is determined that DL Control Tx Type is not Duplicate, the processing proceeds to step S137.

In step S137, the shared AP determines whether or not DL Control Tx Type is Coordinated OFDMA. In a case where it is determined in step S137 that DL Control Tx Type is Coordinated OFDMA, the processing proceeds to step S138.

In step S138, the shared AP performs transmission processing in Coordinated OFDMA. The transmission processing in Coordinated OFDMA will be described later with reference to FIG. 18. With this processing, the shared AP transmits the DL control signal in coordination with the sharing AP in Coordinated OFDMA, and receives the UL Data frame from the STA.

In step S137, in a case where it is determined that DL Control Tx Type is not Coordinated OFDMA, the processing proceeds to step S139.

In step S139, the shared AP determines whether or not PCH Info included in the MAP trigger frame is a current PCH. In a case where it is determined in step S139 that PCH Info included in the MAP trigger frame is not the current PCH, the processing proceeds to step S140.

In step S140, the shared AP performs transmission processing by channel switching of the shared AP. The transmission processing by channel switching of the shared AP is processing similar to the processing described above with reference to FIG. 13. With this processing, the shared AP transmits the DL control signal in coordination with the sharing AP by channel switching of the shared AP, and receives the UL Data frame from the STA.

In step S139, in a case where it is determined that PCH Info included in the MAP trigger frame is the current PCH, the processing proceeds to step S141.

In step S141, the shared AP performs transmission processing by channel switching of another AP (in this case, sharing AP). The transmission processing by channel switching of another AP will be described later with reference to FIG. 19. With this processing, the shared AP transmits the DL control signal in coordination with the sharing AP by channel switching of another AP, and receives the UL Data frame from the STA.

After Steps S133, S136, S138, S140, or S141, the processing of FIG. 16 ends.

Figure 17:
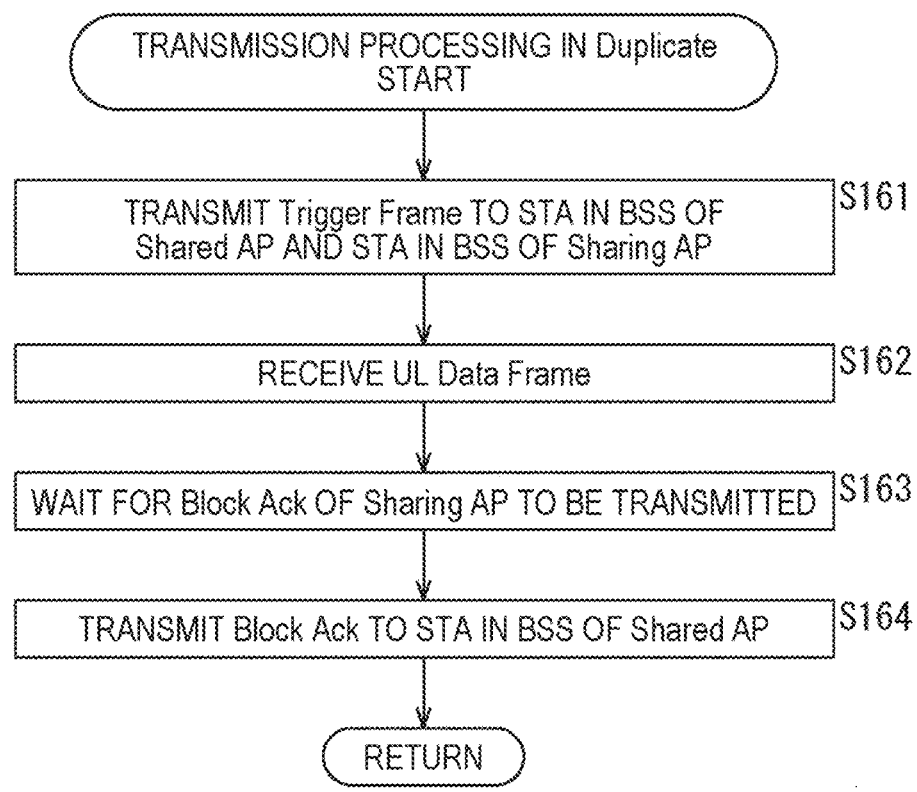
FIG. 17 is a flowchart illustrating transmission processing in Duplicate in step S136 of FIG. 16.

FIG. 17 is a flowchart illustrating transmission processing in Duplicate in step S136 of FIG. 16.

In step S161, the shared AP transmits the trigger frame to the STA in the BSS of the shared AP and the STA in the BSS of the sharing AP.

The STA specified by the trigger frame transmits the UL Data frame.

In step S162, the shared AP receives the UL Data frame transmitted from the STA.

In step S163, the shared AP waits the BA of the sharing AP to be transmitted.

In step S164, the shared AP transmits the BA to the STA in the BSS of the shared AP.

Figure 18:
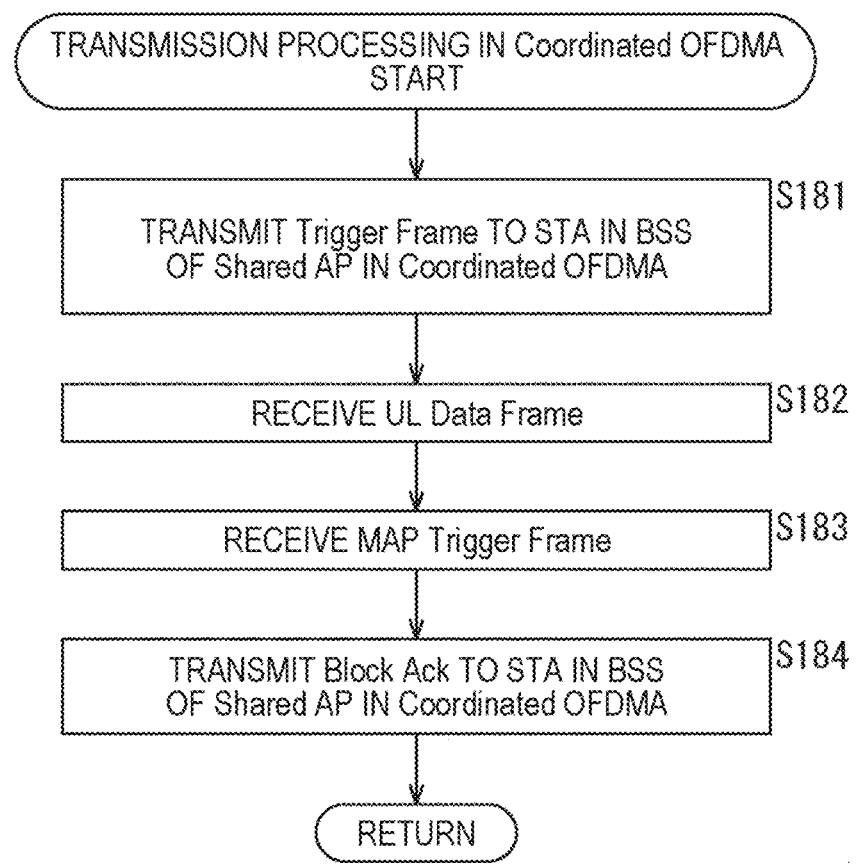
FIG. 18 is a flowchart illustrating transmission processing in Coordinated OFDMA in step S138 of FIG. 16.

FIG. 18 is a flowchart illustrating transmission processing in Coordinated OFDMA in step S138 of FIG. 16.

In step S181, the shared AP transmits the trigger frame to the STA in the BSS of the shared AP in Coordinated OFDMA.

In step S182, the shared AP receives the UL Data frame.

The sharing AP transmits, to the shared AP, the MAP trigger frame including RU Info used for transmission of the BA.

In step S183, the shared AP receives the MAP trigger frame.

In step S184, the shared AP transmits the BA to the STA in the BSS of the shared AP in Coordinated OFDMA.

Figure 19:
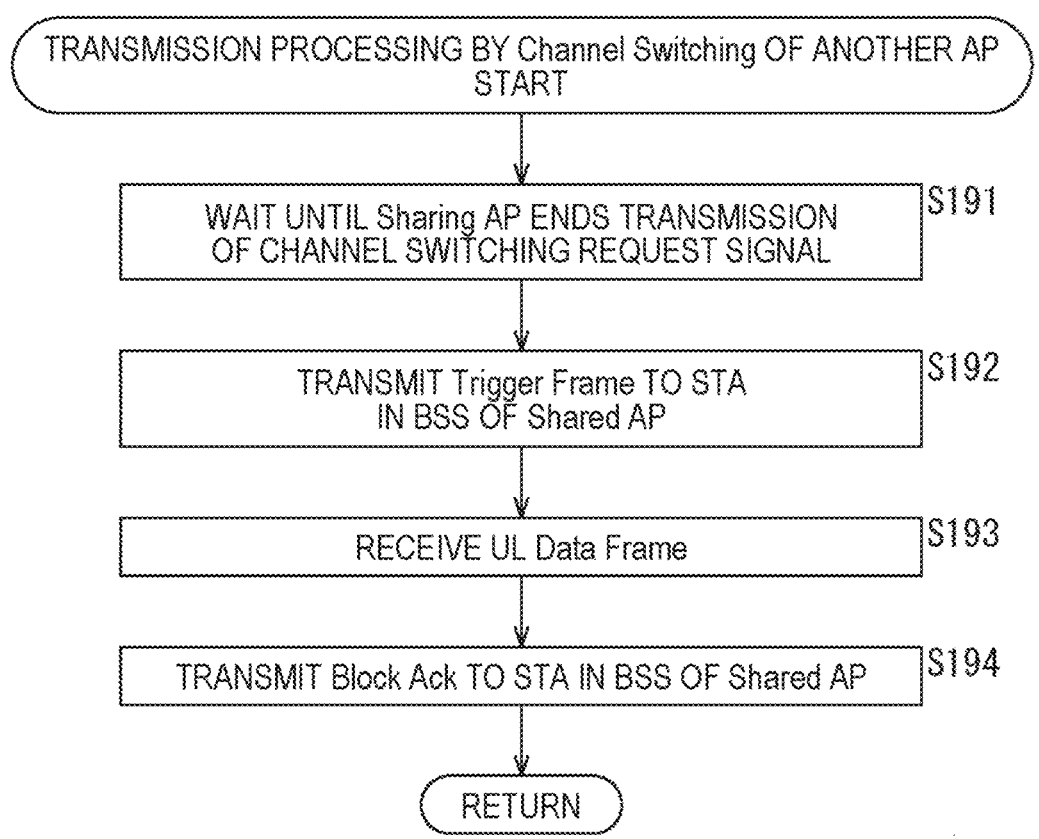
FIG. 19 is a flowchart illustrating transmission processing by channel switching of another AP in step S141 of FIG. 16.

FIG. 19 is a flowchart illustrating transmission processing by channel switching of another AP in step S141 of FIG. 16.

In step S191, the shared AP waits until the sharing AP ends transmission of the channel switching request signal.

In step S192, the shared AP transmits the trigger frame to the STA in the BSS of the shared AP.

In step S193, the shared AP receives the UL Data frame.

In step S194, the shared AP transmits the BA to the STA in the BSS of the shared AP in the switched channel.

<Effect of First Embodiment>

Figure 20:
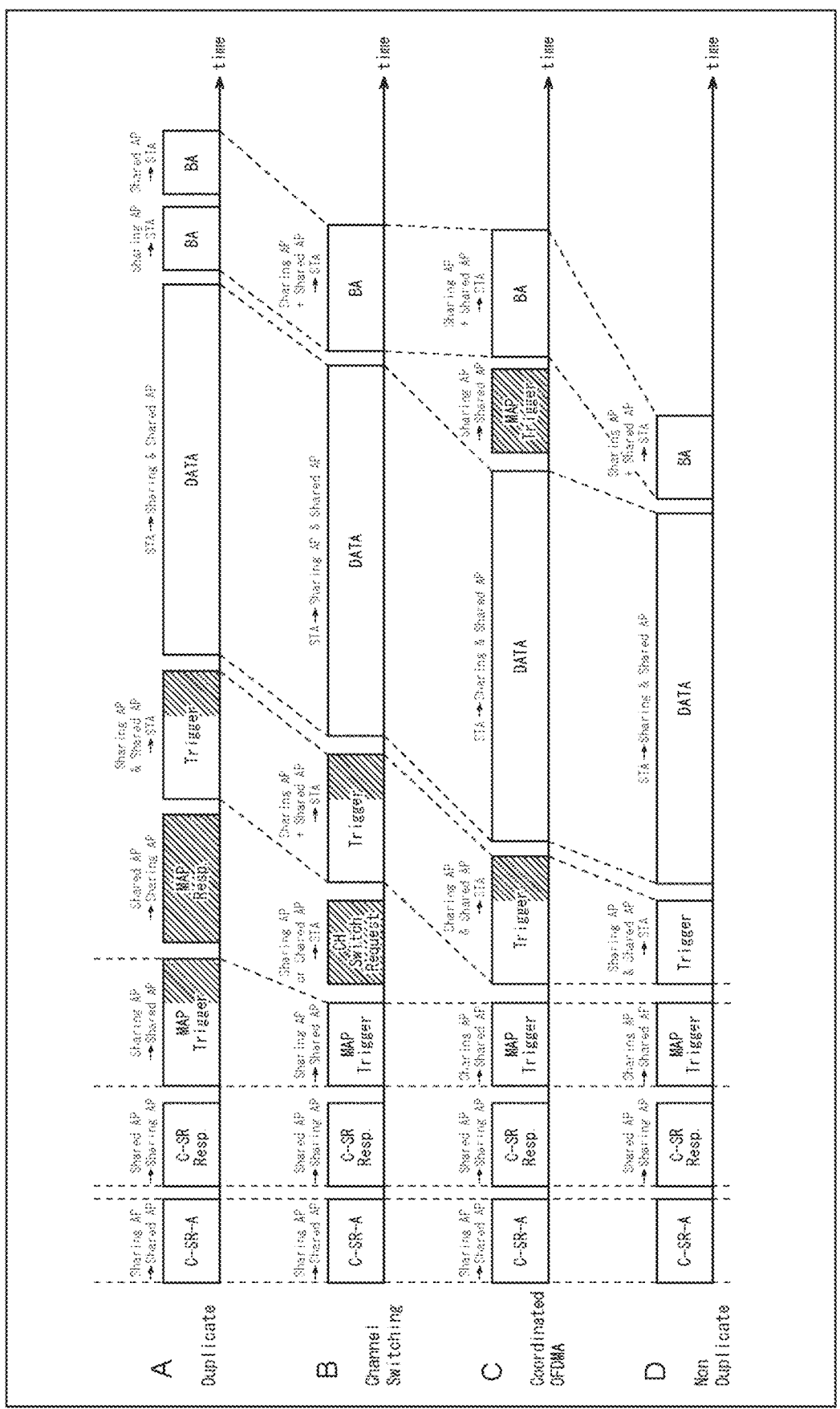
FIG. 20 is a diagram illustrating an effect of the first embodiment of the present technology.

FIG. 20 is a diagram illustrating an effect of the first embodiment of the present technology.

In A to D of FIG. 20, a frame sequence of each of transmission methods of Duplicate, Channel Switching, Coordinated OFDMA, and Non Duplicate in order and images of required times thereof are illustrated. In FIG. 20, hatching is applied to a frame or a part of the frame whose required time is increased as compared with other transmission methods.

In the case of Duplicate in A of FIG. 20, MAP response information that is a response of MAP Trigger needs to be acquired once from the shared AP, and information more than others needs to be exchanged in MAP Trigger. Therefore, since the required time and the number of frames are increased accordingly, the required time is required more than other transmission methods.

In the case of Channel Switching in B of FIG. 20, a signal for switching a channel (channel switch request frame) is additionally required, and the number of frames increases. In the case of Coordinated OFDMA in C of FIG. 20, MAP trigger frame transmission before the BA is additionally required, and the number of frames increases.

In the case of Non Duplicate in D of FIG. 20, the number of frames required is the smallest, and further, a trigger and BA can be transmitted in a wide band. Therefore, a frame transmission time can be expected to be reduced as compared with other methods.

As described above, in the present technology, since the transmission of Non Duplicate is prioritized and the transmission method of the DL control signal is determined, the transmission time (that is, overhead) of the control signal with respect to a data transmission time can be shortened.

Furthermore, in a case where the sharing AP can perform transmission only in a band of 20 MHz, by selectively using Duplicate and Non duplicate other than Channel Switching and Coordinated OFDMA, it is possible to guarantee transmission of the DL control signal to all the STAs while reducing the overhead as much as possible.

As described above, according to the present technology, optimal data transmission can be performed according to the situation.

Note that, in the above description, an example of determining one transmission method from among four transmission methods has been described, but one transmission method may be determined from among two or three transmission methods of four transmission methods.

3. Second Embodiment

In the first embodiment, the transmission method of the DL control signal is determined by the sharing AP. In the case of the first embodiment, in order for the Sharing AP to determine whether or not the DL control signal can be transmitted in Duplicate, for example, the Sharing AP needs to get information necessary for determining transmission. The information necessary for determining the transmission includes the propagation loss value between all the APs and all the STAs, which is acquired in the phase Ph2 (RSSI measurement phase) in FIG. 4, the capability information of the APs and the STAs, which is acquired in the phase Ph1 (association phase), and the CCA result (information indicating a carrier sensing result) acquired in the C-SR response frame, as described above.

Accordingly, in the second embodiment, an example will be introduced in which together with the sharing AP, the shared AP also determines the transmission method of the DL control signal on the basis of the information exchange. Specifically, the sharing AP finally determines an optimal transmission method on the basis of the transmission method determined by the shared AP.

In the case of the second embodiment, even in a case where the sharing AP does not get the propagation loss value between all the APs and all the STAs, when the sharing AP can obtain at least only the propagation loss information between the STAs of the sharing AP, the sharing AP can determine whether or not the DL control signal can be transmitted in Duplicate.

Moreover, since the shared AP determines the transmission method of the DL control signal, the determined transmission method of the DL control signal and necessary information corresponding to the transmission method can be transmitted from the shared AP to the sharing AP in the C-SR response described above. Therefore, in the second embodiment, other frames for transmitting necessary information corresponding to the transmission method may not be transmitted depending on the transmission method, and thus, it is possible to further reduce the overhead as compared with the first embodiment.

In the second embodiment, the entire processing sequence is basically similar to the entire processing sequence of the first embodiment described above with reference to FIG. 4. Hereinafter, in the second embodiment, parts different from those of the first embodiment will be described.

<Frame Configuration Example of C-SR Announcement Frame>

Figure 21:
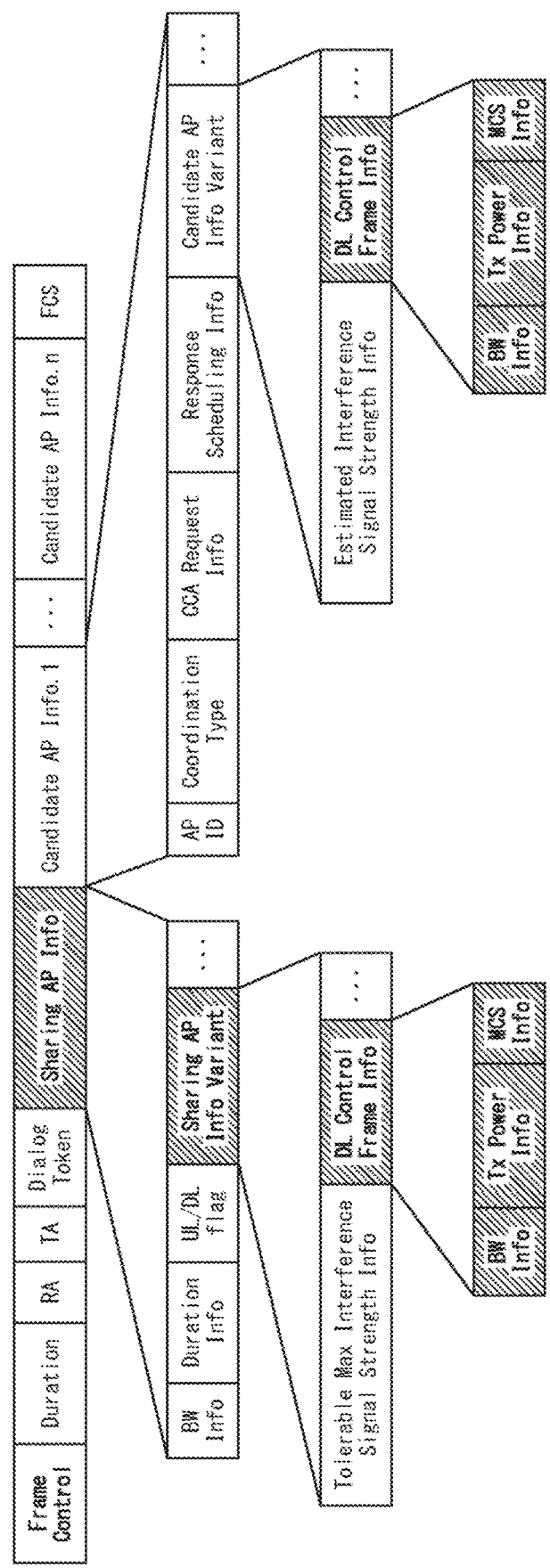
FIG. 21 is a diagram illustrating a frame configuration example of a C-SR announcement frame according to a second embodiment.

FIG. 21 is a diagram illustrating a frame configuration example of the C-SR announcement frame according to the second embodiment.

Note that hatching in FIG. 21 is a field including information which is a characteristic of the present technology, and indicates parts different form the first embodiment. The same applies to subsequent drawings in the second embodiment.

That is, a difference from the first embodiment is that DL Control Frame Info is included in Sharing AP Info Variant and Candidate AP Info Variant, and a bandwidth (BW Info), transmission power information (Tx Power Info), and MCS information (MCS Info), which are transmission parameters used by each AP for transmitting the DL control signal, are stored in DL Control Frame Info.

Although description will be made later with reference to FIG. 23, the shared AP determines the transmission method of the DL control signal by using these transmission parameters.

Note that in a case where it is assumed that the DL control signal is transmitted by all the APs by using the same transmission parameter, DL Control Frame Info in Candidate AP Info Variant may be omitted. In this case, the shared AP also sets the transmission parameter of the DL control signal on the basis of DL Control Frame Info in Sharing AP Info Variant.

<Frame Configuration Example of C-SR Response Frame>

Figure 22:
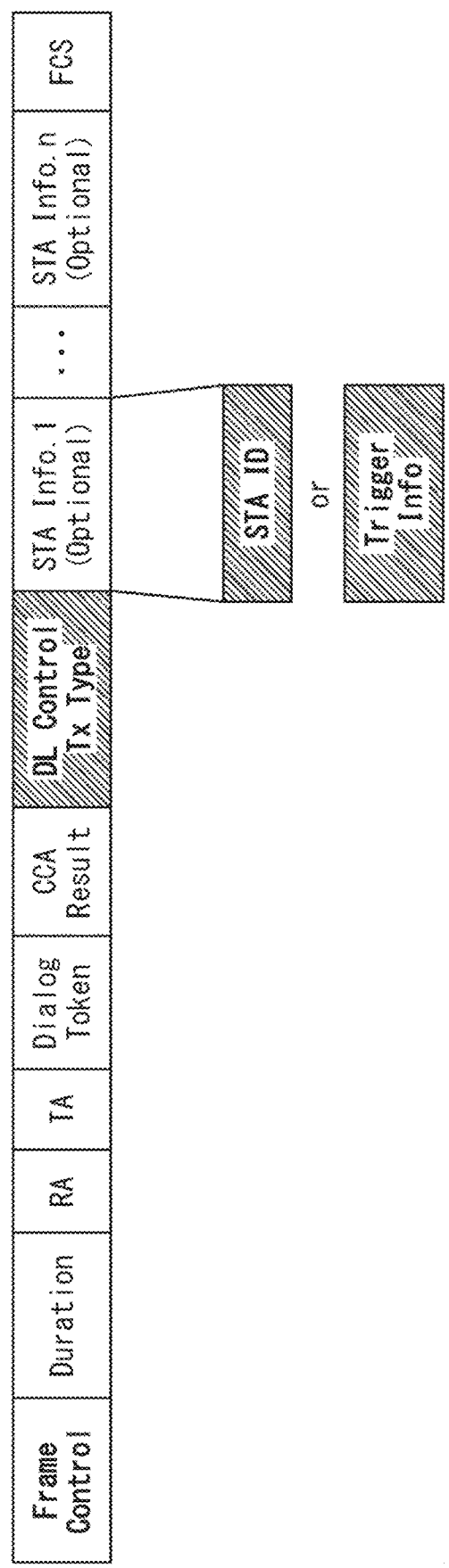
FIG. 22 is a diagram illustrating a frame configuration example of a C-SR response frame according to the second embodiment.

FIG. 22 is a diagram illustrating a frame configuration example of the C-SR response frame according to the second embodiment.

In FIG. 22, a difference from the first embodiment is that Dl Control Tx Type information is included in this frame, and STA Info can include not only STA ID but also Trigger Info to be transmitted to the STA by the shared AP.

Although description will be made later with reference to FIG. 23, the information included in this field varies depending on the transmission method the DL control signal, which is determined by the shared AP. Furthermore, notification of STA Info itself may not be provided depending on the transmission method of the DL control signal, which is determined by the shared AP.

<Processing of Each AP in C-SR Tx Phase>

Figure 23:
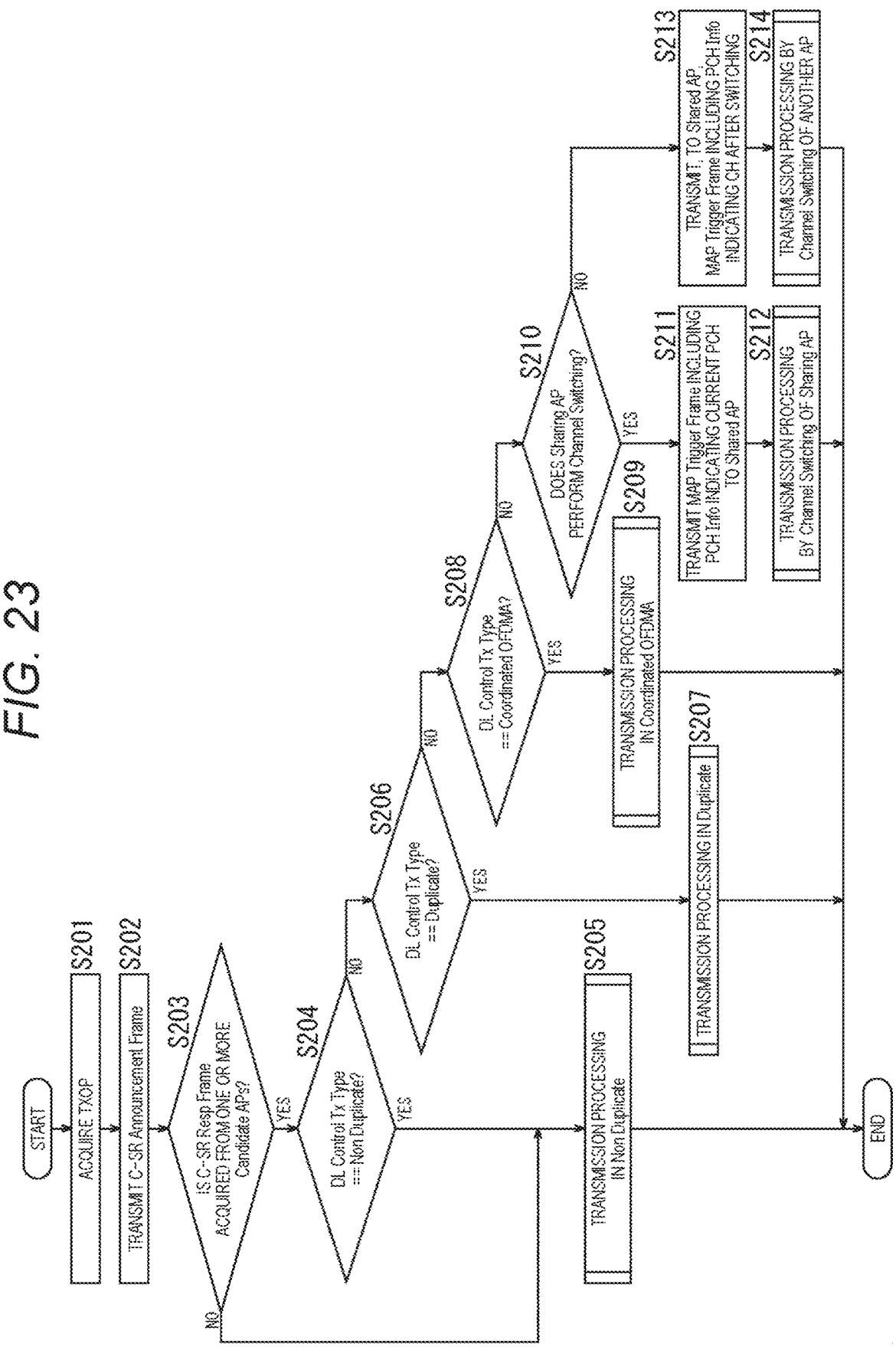
FIG. 23 is a flowchart illustrating processing of a sharing AP (AP 1) according to the second embodiment.

FIG. 23 is a flowchart illustrating processing of the sharing AP (AP 1) according to the second embodiment.

In FIG. 23, a difference from the first embodiment (FIG. 9) is as follows.

The transmission method of the DL control signal is determined by each shared AP, and is finally determined by the sharing AP on the basis of DL Control Tx Type in the C-SR response returned from the shared AP.

At the time of transmission in Non Duplicate, the sharing AP does not transmit the MAP Trigger but transmits the trigger frame to the STA in the same BSS as it is. Note that this is because the transmission parameters of the trigger and the BA have already been shared between the sharing AP and the shared AP, and it can be confirmed that there is no problem in simultaneous transmission.

At the time of Duplicate transmission, the sharing AP transmits the trigger frame to the STA in the same BSS after the transmission of the MAP trigger (after reception of the MAP trigger in the shared AP). This is because the shared AP responds with Trigger Info in the C-SR response, and thus, when Trigger Info of the sharing AP is shared in the MAP trigger, Duplicate transmission becomes possible.

That is, in step S201 of FIG. 23, the AP 1 acquires a transmission opportunity (TROP).

In step S202, the AP 1 as the sharing AP transmits a C-SR announcement frame. Hereinafter, a subject will be described as the sharing AP.

In step S203, the sharing AP determines whether or not the C-SR response frame is acquired from one or more candidate APs. In a case where it is determined in step S203 that the C-SR response frame is acquired from one or more candidate APs, the processing proceeds to step S204.

Here, the shared AP is selected from among the candidate APs that have transmitted the C-SR response frame.

In step S204, the sharing AP determines whether or not DL Control Tx Type of the C-SR response frame is Non Duplicate. In a case where it is determined in step S204 that DL Control Tx Type is Non Duplicate, the processing proceeds to step S205.

In step S203, also in a case where it is determined that the C-SR response frame is not acquired from one or more candidate APs, the processing proceeds to step S205.

In step S205, the sharing AP performs transmission processing in Non Duplicate. The transmission processing in Non Duplicate is processing similar to the processing described above with reference to FIG. 10. With this processing, the sharing AP transmits the DL control signal in coordination with the shared AP in Non Duplicate, and receives the UL Data frame from the STA. Note that the term "Non Duplicate" as used herein includes a case where the shared AP does not exist, and only the AP 1 transmits the trigger frame.

In step S204, in a case where it is determined that DL Control Tx Type is not Non Duplicate, the processing proceeds to step S206.

In step S206, the sharing AP determines whether or not DL Control Tx Type of the C-SR response frame is Duplicate. In a case where it is determined in step S206 that DL Control Tx Type is Duplicate, the processing proceeds to step S207.

In step S207, the sharing AP performs transmission processing in Duplicate. The transmission processing in Duplicate will be described later with reference to FIG. 24. With this processing, the sharing AP transmits the DL control signal in coordination with the shared AP in Duplicate, and receives the UL Data frame from the STA.

In step S206, in the sharing AP, in a case where it is determined that DL Control Tx Type of the C-SR response frame is not Duplicate, the processing proceeds to step S208.

In step S208, the sharing AP determines whether or not DL Control Tx Type of the C-SR response frame is Coordinated OFDMA. In a case where it is determined in step S208 that DL Control Tx Type is Coordinated OFDMA, the processing proceeds to step S209.

In step S209, the sharing AP performs transmission processing in Coordinated OFDMA. The transmission processing in Coordinated OFDMA is processing similar to the processing described above with reference to FIG. 12. With this processing, the sharing AP transmits the DL control signal in coordination with the shared AP in Coordinated OFDMA, and receives the UL Data frame from the STA.

In step S208, in a case where it is determined that DL Control Tx Type cannot be Coordinated OFDMA, the processing proceeds to step S210.

In step S210, the sharing AP determines whether or not to perform channel switching. In a case where it is determined in step S210 that the sharing AP performs the channel switching, the processing proceeds to step S211.

In step S211, the sharing AP transmits, to the shared AP, the MAP trigger frame including PCH Info indicating a current PCH.

In step S212, the sharing AP performs transmission processing by channel switching of the sharing AP. The transmission processing by channel switching of the shared AP is processing similar to the processing described above with reference to FIG. 13. With this processing, the sharing AP transmits the DL control signal in coordination with the shared AP by channel switching of the sharing AP, and receives the UL Data frame from the STA.

In step S210, in a case where it is determined that the sharing AP does not perform the channel switching, the processing proceeds to step S213.

In step S213, the sharing AP transmits, to the shared AP, the MAP trigger frame including PCH Info indicating a CH after switching.

In step S214, the sharing AP performs transmission processing by channel switching of another AP (in this case, shared AP). The transmission processing by channel switching of another AP is processing similar to the processing described above with reference to FIG. 14. With this processing, the sharing AP transmits the DL control signal in coordination with the shared AP by channel switching of the shared AP, and receives the UL Data frame from the STA.

After Steps S205, S207, S209, S212, or S214, the processing of FIG. 23 ends.

Note that FIG. 23 illustrates an example in which the Sharing AP determines the transmission method on the basis of DL Control Tx Type of the C-SR response frame. However, when the transmission method of the DL control signal is other than Non Duplicate, the transmission method may be determined by the determination by the sharing AP. That is, DL Control Tx Type different from that of the shared AP may be specified and transmitted in the MAP trigger frame.

Figure 24:
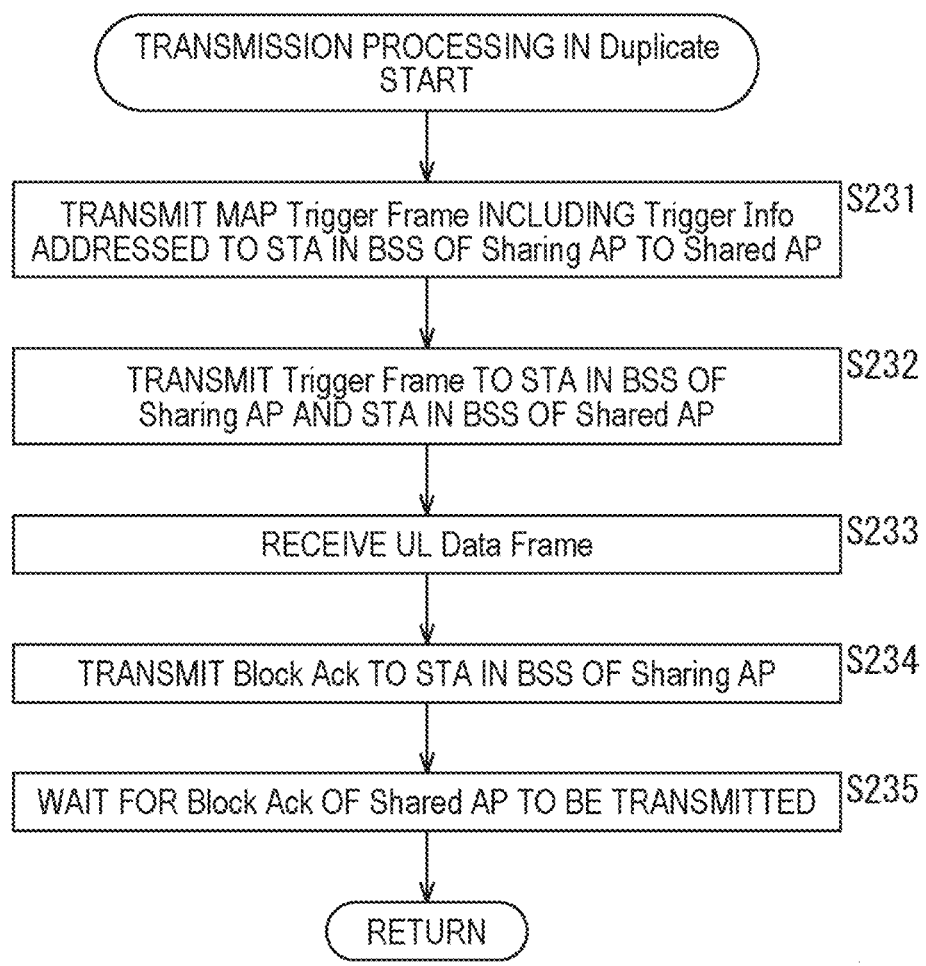
FIG. 24 is a flowchart illustrating transmission processing in Duplicate in step S207 of FIG. 23.

FIG. 24 is a flowchart illustrating transmission processing in Duplicate in step S207 of FIG. 23.

In step S231, the sharing AP transmits, to the shared AP, the MAP trigger frame including Trigger Info addressed to the STA in the BSS of the sharing AP.

In step S232, the sharing AP transmits the trigger frame to the STA in the BSS of the sharing AP and the STA in the BSS of the shared AP.

The STA specified by the trigger frame transmits the UL Data frame.

In step S233, the sharing AP receives the UL Data frame transmitted from the STA.

In step S234, the sharing AP transmits the BA to the STA in the BSS of the sharing AP.

In step S235, the sharing AP waits the BA of the shared AP to be transmitted.

Note that, similarly to the example of FIG. 11, since it is difficult for the APs to share the information of the current BA at the time of duplicate transmission, an example in which only the BA is transmitted in TDD has been described here, but the BA may be transmitted as a duplicate frame similarly to the trigger frame.

Figure 25:
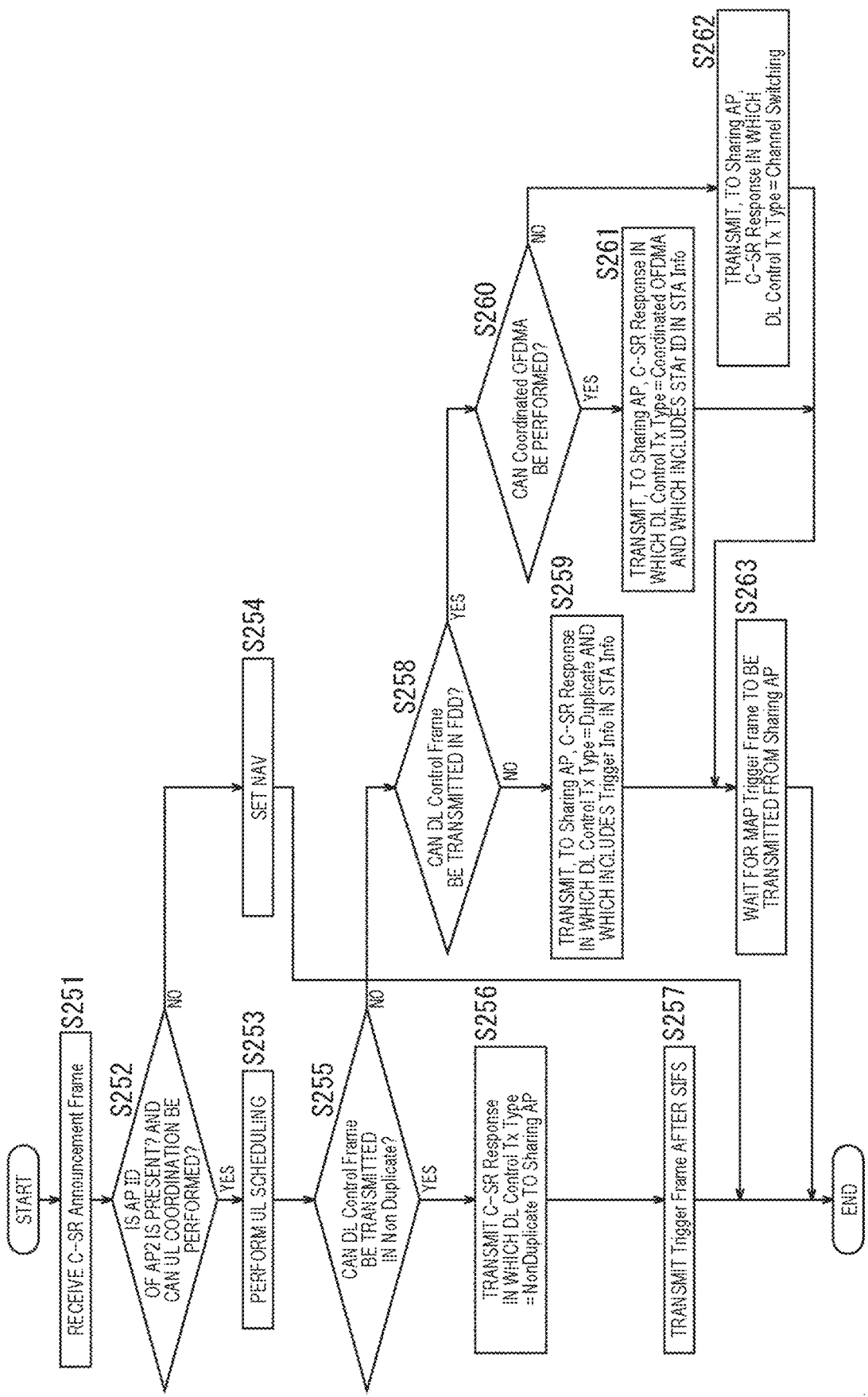
FIG. 25 is a flowchart illustrating processing of a shared AP (AP 2) according to the second embodiment.

FIG. 25 is a flowchart illustrating processing of the shared AP (AP 2) according to the second embodiment.

Note that the processing in FIG. 25 is processing at the time of receiving the C-SR announcement frame transmitted in step S12 of FIG. 4.

A difference from the first embodiment (FIG. 15) is that after the UL scheduling, the shared AP determines the transmission method of the DL control signal on the basis of the acquired information, and performs notification in DL Tx Type in the C-SR response. Note that information necessary for each determination is information acquired in the previous phase Ph1 or phase Ph2 or provided in notification in the C-SR announcement frame.

In step S251 of FIG. 25, the AP 2 receives the C-SR announcement frame.

In step S252, the AP 2 determines whether or not AP ID of the AP2 is present and whether or not UL coordination can be performed on the basis of the C-SR announcement frame. In a case where it is determined in step S252 whether or not the AP ID of the AP 2 is present and that the UL coordination can be performed, the processing proceeds to step S253.

In step S253, the AP 2 as the shared AP performs UL scheduling.

In step S252, in a case where it is determined that the AP ID of the shared AP is not present or the UL coordination cannot be performed, the processing proceeds to step S254.

In step S254, the AP 2 performs NAV setting. After step S254, the processing of FIG. 25 ends.

After step S253, the processing proceeds to step S255. Hereinafter, a subject will be described as the shared AP.

In step S255, the shared AP determines whether or not DL control signal can be transmitted in Non Duplicate.

For example, in a case where all the APs transmit the DL control signal with the transmission parameter specified at the same time or specified by the all the APs, when a SINR of the STA in the same BSS, which the AP intends to trigger the UL transmission of in the trigger frame, satisfies an allowable value, it is determined that the DL control signal can be transmitted in Non Duplicate. The SINR of the STA in the same BSS, which the AP intends to trigger the UL transmission of in the trigger frame, is acquired, for example, in the phase Ph2 in FIG. 4.

In step S255, in a case where it is determined that the DL control signal can be transmitted in Non Duplicate, the processing proceeds to step S256.

In step S256, the shared AP transmits, to the sharing AP, the C-SR response frame in which DL Control Tx Type=Non Duplicate. Thereafter, the processing proceeds to step S257.

In step S257, the shared AP transmits the trigger frame after SIFS.

In step S255, in a case where it is determined that the DL control signal cannot be transmitted in Non Duplicate, the processing proceeds to step S258.

In step S258, the shared AP determines whether or not DL control signal can be transmitted in FDD.

For example, on the basis of the C-SR announcement frame, in a case where the sharing AP can acquire a transmission opportunity in a bandwidth of 40 MHz or more, it is determined in step S258 that the DL control signal cannot be transmitted in FDD, and the processing proceeds to step S259.

In step S259, the shared AP transmits, to the sharing AP, the C-SR response frame in which DL Control Type is Duplicate and which includes Trigger Info in STA Info.

In step S258, in the shared AP, in a case where it is determined that the DL control signal can be transmitted in FDD, the processing proceeds to step S260.

In step S260, the shared AP determines whether or not Coordinated OFDMA can be performed. For this determination, the capability information acquired in the phase Ph1 of FIG. 4, the carrier sensing result of the shared AP, and the like are used.

In a case where Coordinated OFDMA can be performed for both the sharing AP and the shared AP in the capability information acquired in the phase Ph1 in FIG. 4, it is determined in step S260 that the Coordinated OFDMA can be performed, and the processing proceeds to step S261.

In step S261, the shared AP transmits, to the sharing AP, the C-SR response frame in which DL Control Type is Coordinated OFDMA and which includes STA ID in STA Info.

In step S260, in a case where it is determined that Coordinated OFDMA cannot be performed, the processing proceeds to step S262.

In step S262, the shared AP transmits, to the sharing AP, the C-SR response frame in which DL Control Type is Channel Switching on the basis of a carrier sensing result of the shared AP.

After Steps S259, S261, or S262, the processing proceeds to step S263.

In step S263, the shared AP waits the MAP trigger frame to be transmitted from the sharing AP.

After Steps S257 or S263, the processing of FIG. 25 ends.

Figure 26:
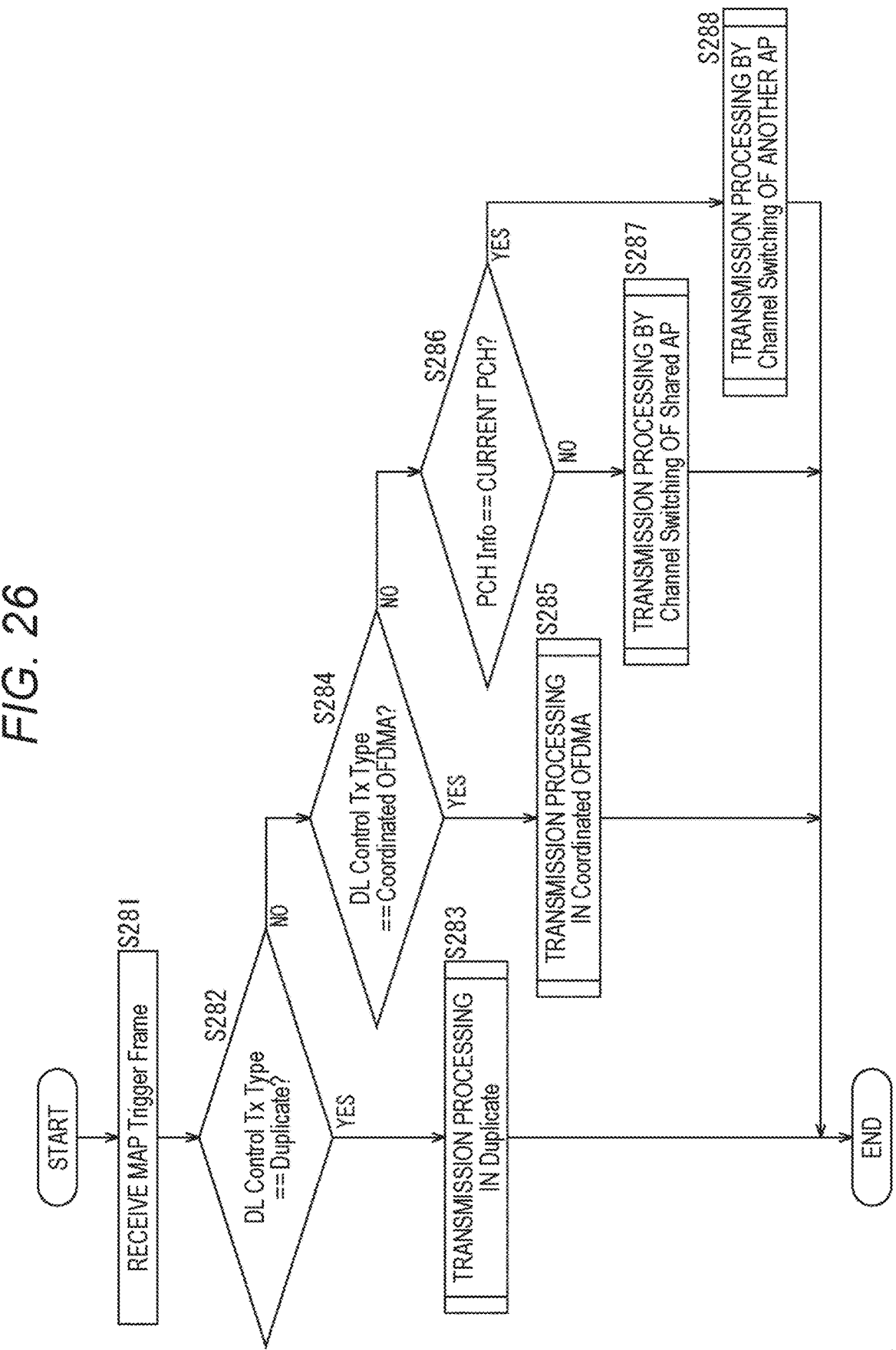
FIG. 26 is a flowchart illustrating processing of a shared AP (AP 2) according to the second embodiment.

FIG. 26 is a flowchart illustrating another processing of the shared AP (AP 2) according to the second embodiment.

Note that the processing in FIG. 26 is processing at the time of receiving the MAP trigger frame transmitted in step S14 of FIG. 4.

A difference from the first embodiment (FIG. 16) is that, in the flowchart of FIG. 26, processing related to the transmission method in Non Duplicate is omitted. This is because, as described above, the MAP trigger is not transmitted at the time of transmission in Non Duplicate.

In step S281 of FIG. 26, the shared AP receives the MAP trigger frame.

In step S282, the shared AP determines whether or not DL Control Tx Type included in the MAP trigger frame is Duplicate. In a case where it is determined in step S282 that DL Control Tx Type is Duplicate, the processing proceeds to step S283.

In step S283, the shared AP performs transmission processing in Duplicate. The transmission processing in Duplicate is processing similar to the processing described above with reference to FIG. 17. With this processing, the shared AP transmits the DL control signal in coordination with the sharing AP in Duplicate, and receives the UL Data frame from the STA. Note that in this case, in step S259 of FIG. 25, the shared AP responds with Trigger Info in the C-SR response and Trigger Info of the sharing AP is shared in the MAP trigger, and thus Duplicate transmission can be performed.

In step S282, in a case where it is determined that DL Control Tx Type is not Duplicate, the processing proceeds to step S284.

In step S284, the shared AP determines whether or not DL Control Tx Type is Coordinated OFDMA. In a case where it is determined in step S284 that DL Control Tx Type is Coordinated OFDMA, the processing proceeds to step S285.

In step S285, the shared AP performs transmission processing in Coordinated OFDMA. The transmission processing in Coordinated OFDMA is processing similar to the processing described above with reference to FIG. 18. With this processing, the shared AP transmits the DL control signal in coordination with the sharing AP in Coordinated OFDMA, and receives the UL Data frame from the STA.

In step S284, in a case where it is determined that DL Control Tx Type is not Coordinated OFDMA, the processing proceeds to step S286.

In step S286, the shared AP determines whether or not PCH Info included in the MAP trigger frame is a current PCH. In a case where it is determined in step S286 that PCH Info included in the MAP trigger frame is not the current PCH, the processing proceeds to step S287.

In step S287, the shared AP performs transmission processing by channel switching of the shared AP. The transmission processing by channel switching of the shared AP is processing similar to the processing described above with reference to FIG. 13. With this processing, the shared AP transmits the DL control signal in coordination with the sharing AP by channel switching of the shared AP, and receives the UL Data frame from the STA.

In step S286, in a case where it is determined that PCH Info included in the MAP trigger frame is the current PCH, the processing proceeds to step S288.

In step S288, the shared AP performs transmission processing by channel switching of another AP (in this case, sharing AP). The transmission processing by channel switching of another AP is processing similar to the processing described above with reference to FIG. 19. With this processing, the shared AP transmits the DL control signal in coordination with the sharing AP by channel switching of another AP, and receives the UL Data frame from the STA.

After Steps S283, S285, S287, or S288, the processing of FIG. 26 ends.

Effect of Second Embodiment

Figure 27:
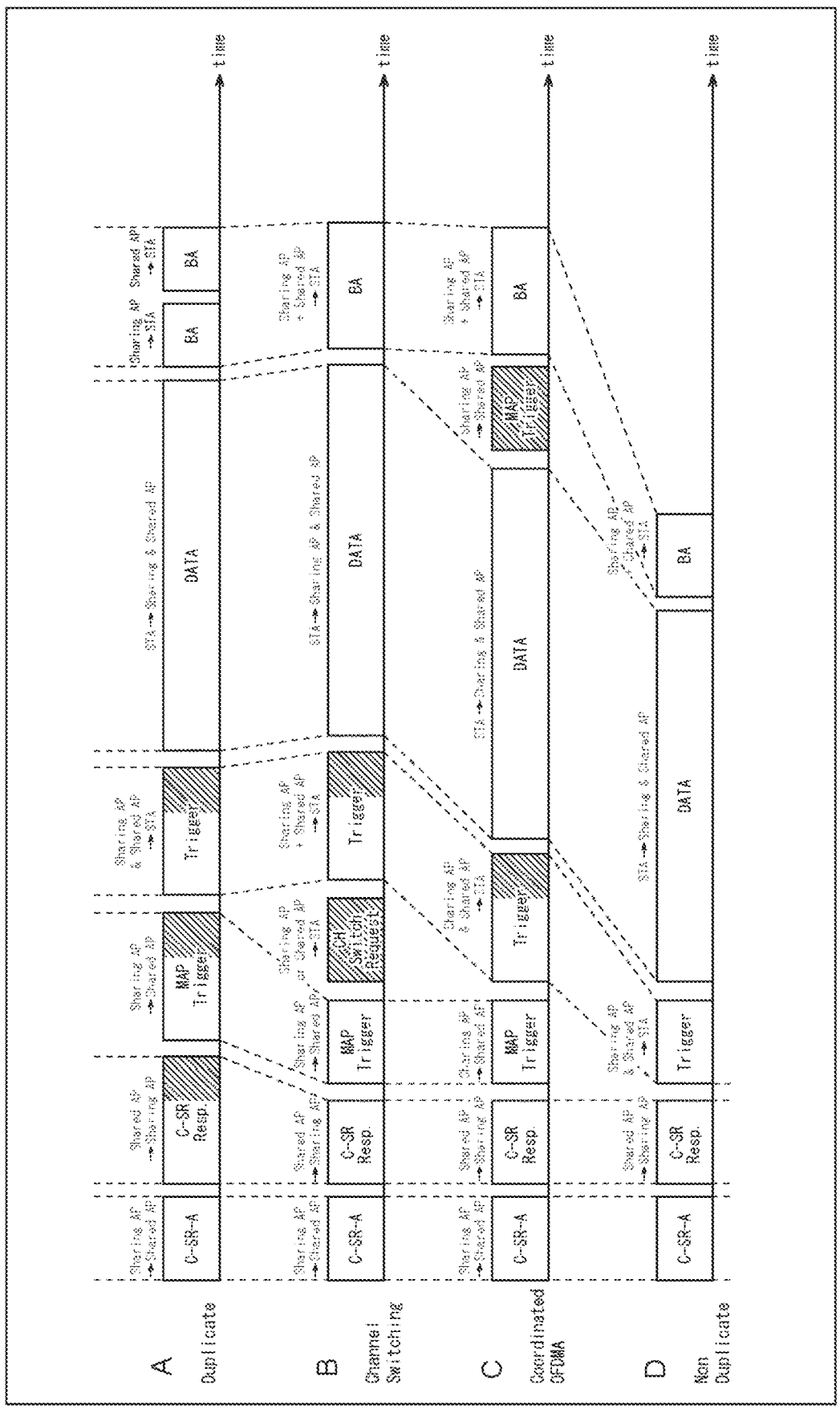
FIG. 27 is a diagram illustrating an effect of the second embodiment of the present technology.

FIG. 27 is a diagram illustrating an effect of the second embodiment of the present technology.

In A to D of FIG. 27, a frame sequence of each of methods of Duplicate, Channel Switching, Coordinated OFDMA, and Non Duplicate in order and images of required times thereof are illustrated. In FIG. 27, hatching is applied to a frame whose required time is increased as compared with other transmission methods.

The second embodiment in which the method of transmitting the DL control signal is determined by the shared AP is different from the first embodiment in which the method of transmitting the DL control signal determined by the sharing AP. According to this, in the second embodiment, the number of frames exchanged at the time of transmission in Duplicate or transmission in Non Duplicate can be reduced as compared with the example of FIG. 20.

For example, in the case of Duplicate in FIG. 27, the number of frames in the C-SR response frame is greater than that in the example in FIG. 20, but instead of this, the MAP response frame does not need to be exchanged, and thus the number of frames exchanged at the time of transmission in Duplicate is reduced.

Furthermore, in the case of the Non Duplicate in FIG. 27, since it is not necessary to exchange the MAP trigger frame, the number of frames exchanged at the time of transmission in Non Duplicate can be further reduced as compared with the example in FIG. 20, and overhead reduction can be expected.

4. Third Embodiment

In the third embodiment, in addition to the second embodiment, the shared AP requests the sharing AP to control the transmission parameter (mainly, transmission power) of the DL control signal, and thus it is possible to further increase opportunity for Non Duplicate transmission of the DL control signal.

In the third embodiment, the entire processing sequence is basically similar to the entire processing sequence of the first embodiment described above with reference to FIG. 4. Hereinafter, in the third embodiment, parts different from those of the first and second embodiments will be described.

<Frame Configuration Example of C-SR Announcement Frame>

Figure 28:
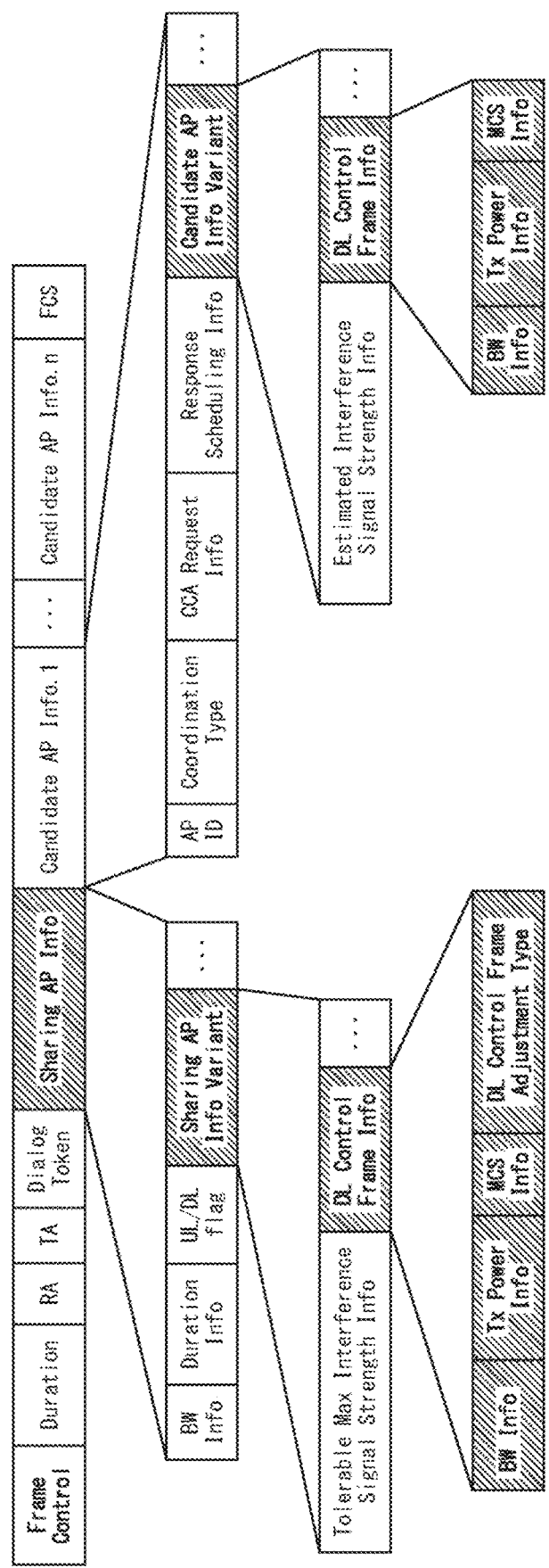
FIG. 28 is a diagram illustrating a frame configuration example of a C-SR announcement frame according to a third embodiment.

FIG. 28 is a diagram illustrating a frame configuration example of the C-SR announcement frame according to the third embodiment.

Note that hatching in FIG. 28 is a field including information which is a characteristic of the present technology, and indicates parts different form the first and second embodiments. The same applies to subsequent drawings in the third embodiment.

That is, a difference from the second embodiment is that a DL control frame adjustment type field is added in DL Control Frame Info of Sharing AP Info Variant. The sharing AP writes information regarding whether or not the transmission parameter of the DL control signal of the sharing AP is adjustable in this field, and notifies the shared AP of the information.

Note that in this field, notification of information indicating that the transmission power of the maximum XdB can be suppressed may be provided.

<Frame Configuration Example of C-SR Response Frame>

Figure 29:
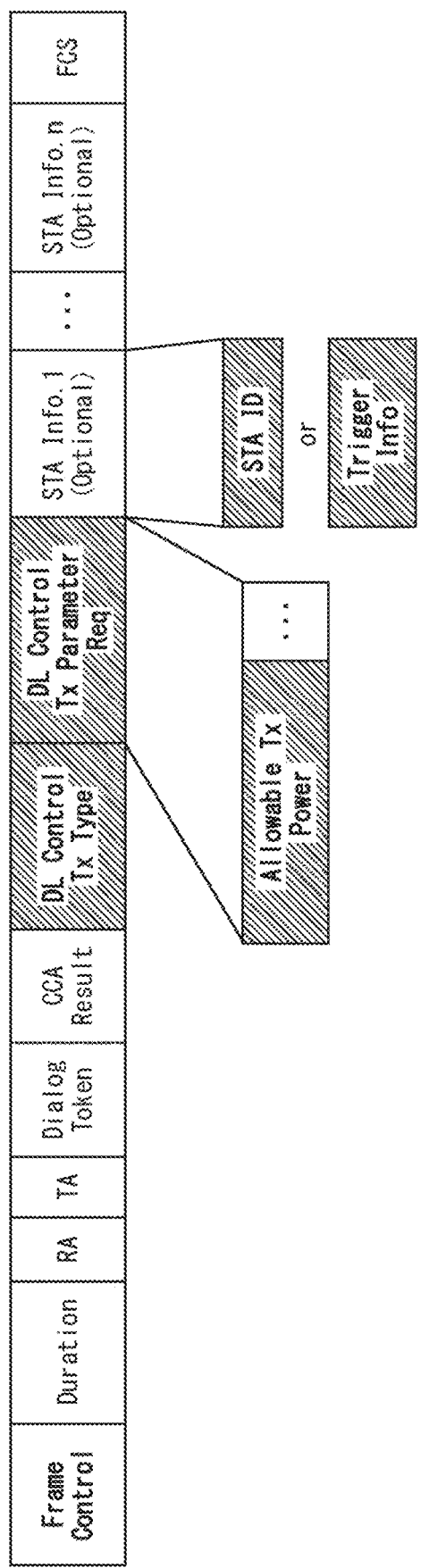
FIG. 29 is a diagram illustrating a frame configuration example of a C-SR Response Frame according to the third embodiment.

FIG. 29 is a diagram illustrating a frame configuration example of the C-SR response frame according to the third embodiment.

In FIG. 29, a difference from the second embodiment is that a Dl Control Tx Parameter Req field is added in this Frame, and that the shared AP requests allowable transmission power information (Allowable Tx Power) of the DL control signal transmitted by the sharing AP and requests the sharing AP to perform transmission power control.

<Processing of Each AP in C-SR Tx Phase>

Figure 30:
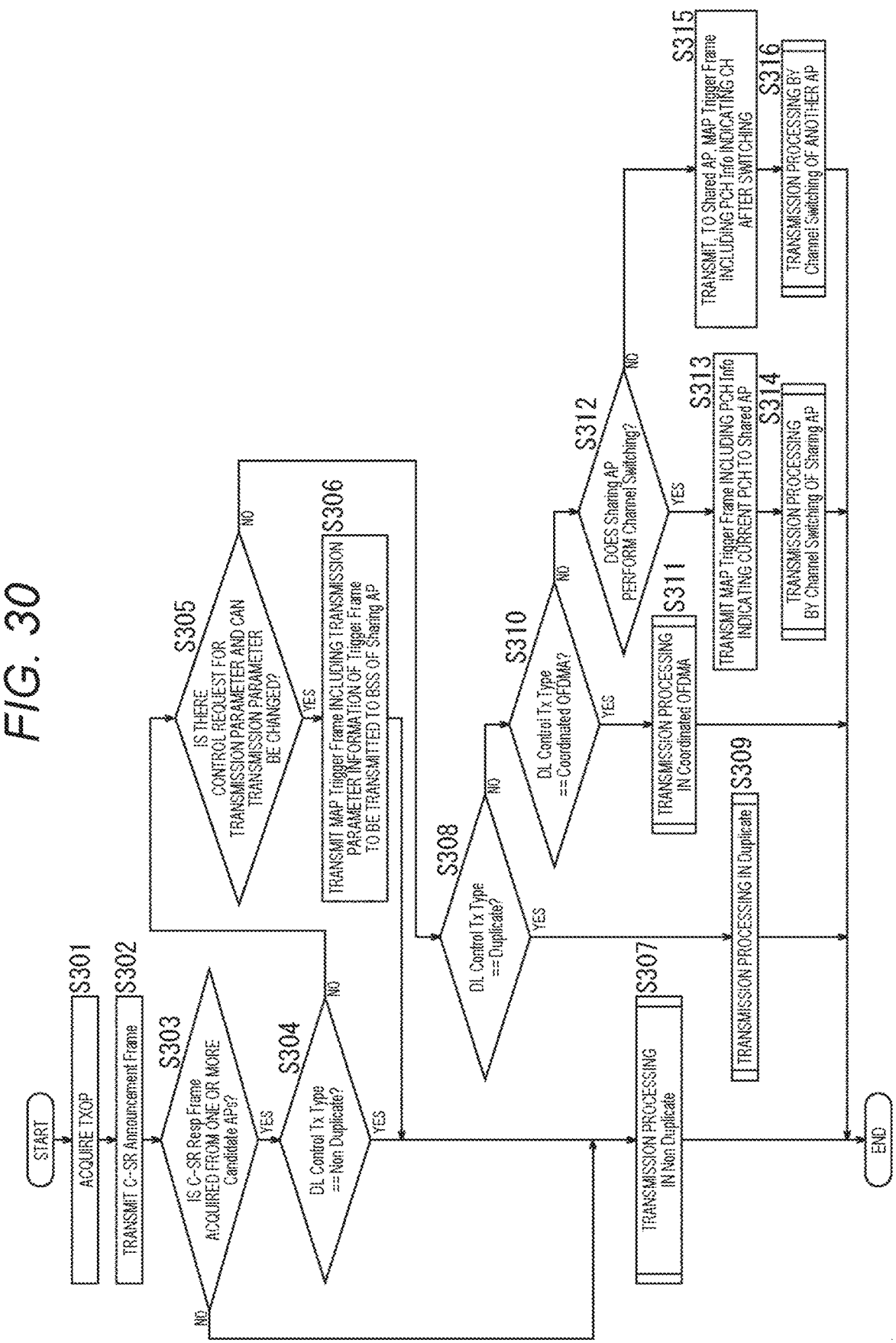
FIG. 30 is a flowchart illustrating processing of a sharing AP (AP 1) according to the third embodiment.

FIG. 30 is a flowchart illustrating processing of the sharing AP (AP 1) according to the third embodiment.

In FIG. 30, a difference from the second embodiment (FIG. 23) is that the sharing AP sets DL Tx Type=Non Duplicate and transmits the MAP trigger frame when the shared AP requests change of transmission parameter in the C-SR response frame and the transmission parameter can be changed.

The transmission parameter being changeable herein means that the STA triggered to perform the UL transmission in the BSS of the sharing AP can receive the DL control signal without any problem with the requested transmission parameter (that is, the SINR estimation value satisfies a request value).

In a case where the transmission parameter cannot be changed, another transmission method is selected as in the second embodiment.

In step S301 of FIG. 30, the AP 1 acquires a transmission opportunity (TROP).

In step S302, the AP 1 as the sharing AP transmits a C-SR announcement frame. Hereinafter, a subject will be described as the sharing AP.

In step S303, the sharing AP determines whether or not the C-SR response frame is acquired from one or more candidate APs. In a case where it is determined in step S303 that the C-SR response frame is acquired from one or more candidate APs, the processing proceeds to step S304.

Here, the shared AP is selected from among the candidate APs that have transmitted the C-SR response frame.

In step S304, the sharing AP determines whether or not DL Control Tx Type of the C-SR response frame is Non Duplicate. In a case where it is determined in step S304 that DL Control Tx Type is not Non Duplicate, the processing proceeds to step S305.

In step S305, the sharing AP determines whether or not there is a control request for a transmission parameter and the transmission parameter can be changed. In a case where it is determined in step S305 that there is the control request for a transmission parameter and the transmission parameter can be changed, the processing proceeds to step S306.

In step S306, the sharing AP transmits a MAP trigger frame including transmission parameter information of the trigger frame to be transmitted to the STA in the BSS of the sharing AP and having DL Tx Type as Non Duplicate. Thereafter, the processing proceeds to step S307.

In a case where it is determined in step S303 that the C-SR response frame is not acquired from one or more candidate APs, or also in a case where it is determined in step S304 that DL Control Tx Type is Non Duplicate, the processing proceeds to step S307.

In step S307, the sharing AP performs transmission processing in Non Duplicate. The transmission processing in Non Duplicate is processing similar to the processing described above with reference to FIG. 10. With this processing, the sharing AP transmits the DL control signal in coordination with the shared AP in Non Duplicate, and receives the UL Data frame from the STA. Note that the term "Non Duplicate" as used herein includes a case where the shared AP does not exist, and only the AP 1 transmits the trigger frame. Thereafter, the processing of FIG. 30 ends.

In a case where it is determined in step S305 that there is not a control request for a transmission parameter and the transmission parameter cannot be changed, the processing proceeds to step S308.

Since the processing in Steps S308 to S316 of FIG. 30 is basically similar to the processing in Steps S206 to S214 of FIG. 23, the description thereof is repeated and thus will be omitted.

Figure 31:
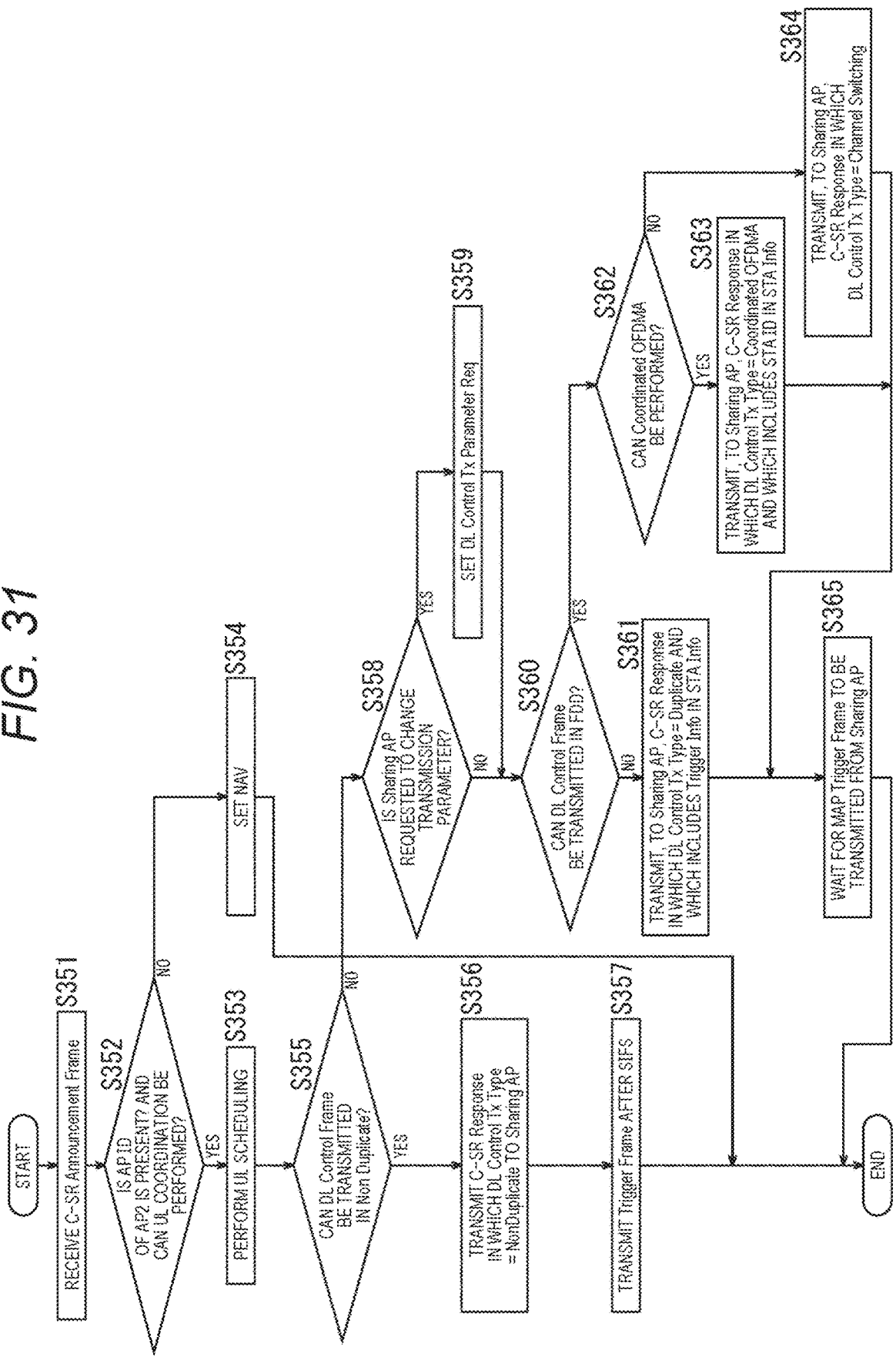
FIG. 31 is a flowchart illustrating processing of a shared AP (AP 2) according to the third embodiment.

FIG. 31 is a flowchart illustrating processing of the shared AP (AP 2) according to the third embodiment.

The processing in FIG. 31 is processing at the time of receiving the C-SR announcement frame transmitted in step S12 of FIG. 4.

Note that the processing in Steps S351 to S354, S356, S357 and Steps S360 to S365 in FIG. 31 is basically similar to the processing in Steps S251 to S257 and Steps S258 to S263 in FIG. 25, and thus the description thereof is repeated and will be omitted.

In step S355 of FIG. 31, in a case where it is determined that the DL control signal cannot be transmitted in Non Duplicate, the processing proceeds to step S358.

In step S358, the shared AP determines whether or not to request the sharing AP to change the transmission parameter. In a case where it is determined in step S358 that the sharing AP is requested to change the transmission parameter, the processing proceeds to step S359.

In step S359, the shared AP sets DL Control Tx Parameter Req. Thereafter, the processing proceeds to step S360.

Furthermore, in a case where it is determined in step S359 that the sharing AP is not requested to change the transmission parameter, the processing proceeds to step S360.

That is, in a case where Non Duplicate transmission can be performed since the shared AP determines that the Non Duplicate transmission of the DL control signal cannot be performed and then changes the transmission parameter of the sharing AP, the shared AP sets DL Control Tx Parameter Req of the C-SR response and then determines another transmission method as in the second embodiment.

On the other hand, in a case where Non Duplicate transmission cannot be performed even when the transmission parameter of the sharing AP is changed, or also in a case where the sharing AP does not permit control for a transmission parameter of the sharing AP (notification with DL Control Frame Adjustment Type in C-SR announcement), the sharing AP determines another transmission method as in the second embodiment.

Effect of Third Embodiment

Figure 32:
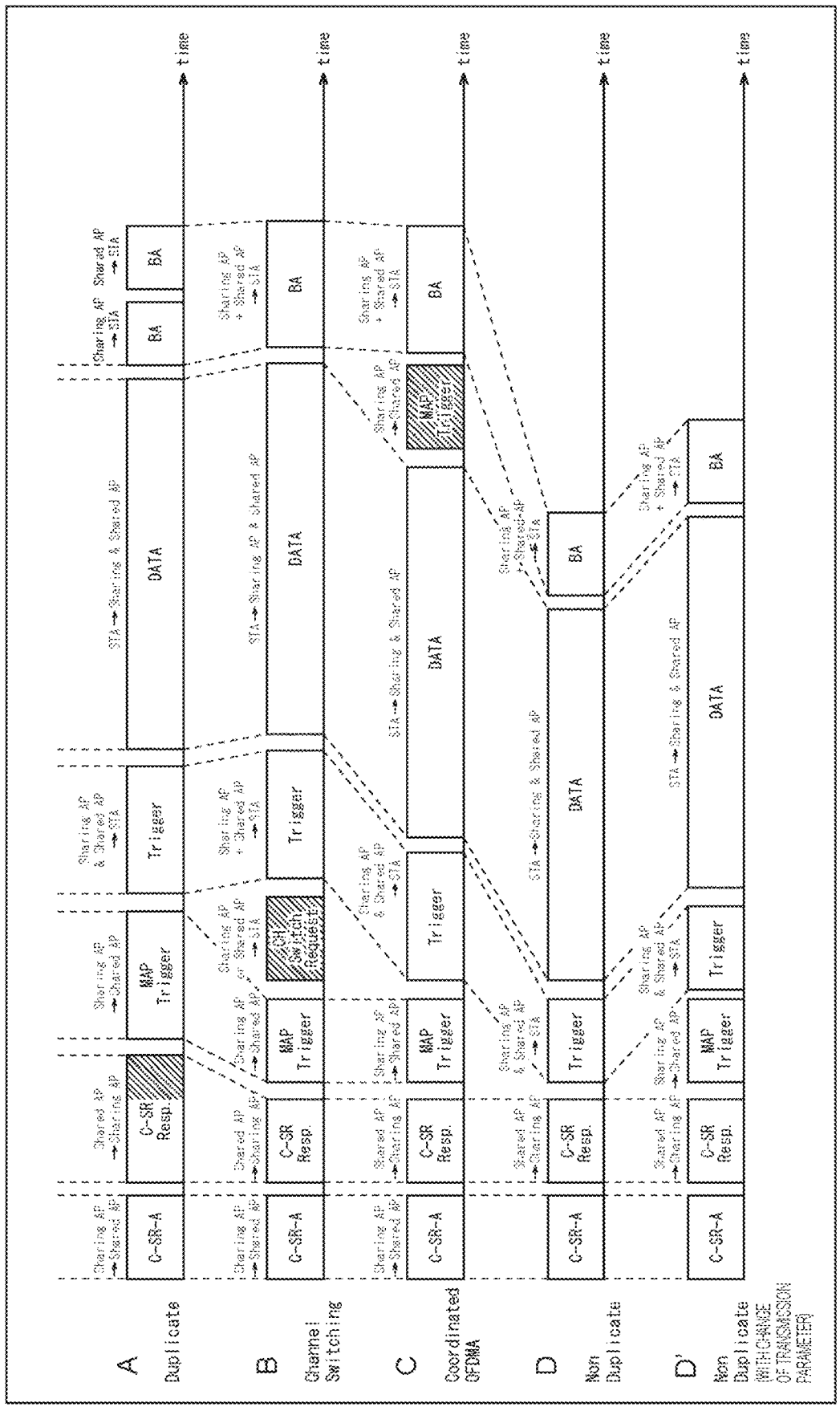
FIG. 32 is a diagram illustrating an effect of the third embodiment of the present technology.

FIG. 32 is a diagram illustrating an effect of the third embodiment of the present technology.

In A to D of FIG. 32, and D' of FIG. 32, a frame sequence of each of methods of Duplicate, Channel Switching, Coordinated OFDMA, Non Duplicate, and Non Duplicate (with change of transmission parameter) in order and images of required times thereof are illustrated. In FIG. 32, hatching is applied to a frame whose required time is increased as compared with other transmission methods.

In the third embodiment, in addition to the case of the second embodiment, it is possible to newly select a case of performing Non Duplicate transmission by changing the transmission parameter (D' in FIG. 32).

In a case where Non Duplicate transmission is performed by changing the transmission parameter, the number of frame exchanges is increased by one (MAP trigger frame) as compared with the case where Non Duplicate transmission is performed without changing the transmission parameter. However, in a case where Non Duplicate transmission is performed by changing the transmission parameter, the trigger and the BA are easily transmitted in a wide band. Therefore, it is still possible to realize overhead reduction as compared with other transmission methods.

5. Others

Effect of Present Technology

As described above, in the present technology, the uplink transmission that is transmission from the wireless communication terminal is performed in coordination with the another wireless communication device. Furthermore, transmission method information indicating a transmission method of a downlink control signal which is a control signal necessary for the uplink transmission, or information necessary for determining the transmission method is acquired from the another wireless communication device.

Accordingly, optimal data transmission can be performed according to the situation.

Moreover, in the present technology, since the transmission of Non Duplicate is prioritized and the transmission method of the DL control signal is determined, the transmission time (that is, overhead) of the control signal with respect to a data transmission time can be shortened.

<Configuration Example of Computer>

The above-described series of processing can be executed by hardware or software. In a case where the series of processing is executed by the software, a program configuring the software is installed from a program recording medium to a computer incorporated in dedicated hardware, a general-purpose personal computer, or the like.

Figure 33:
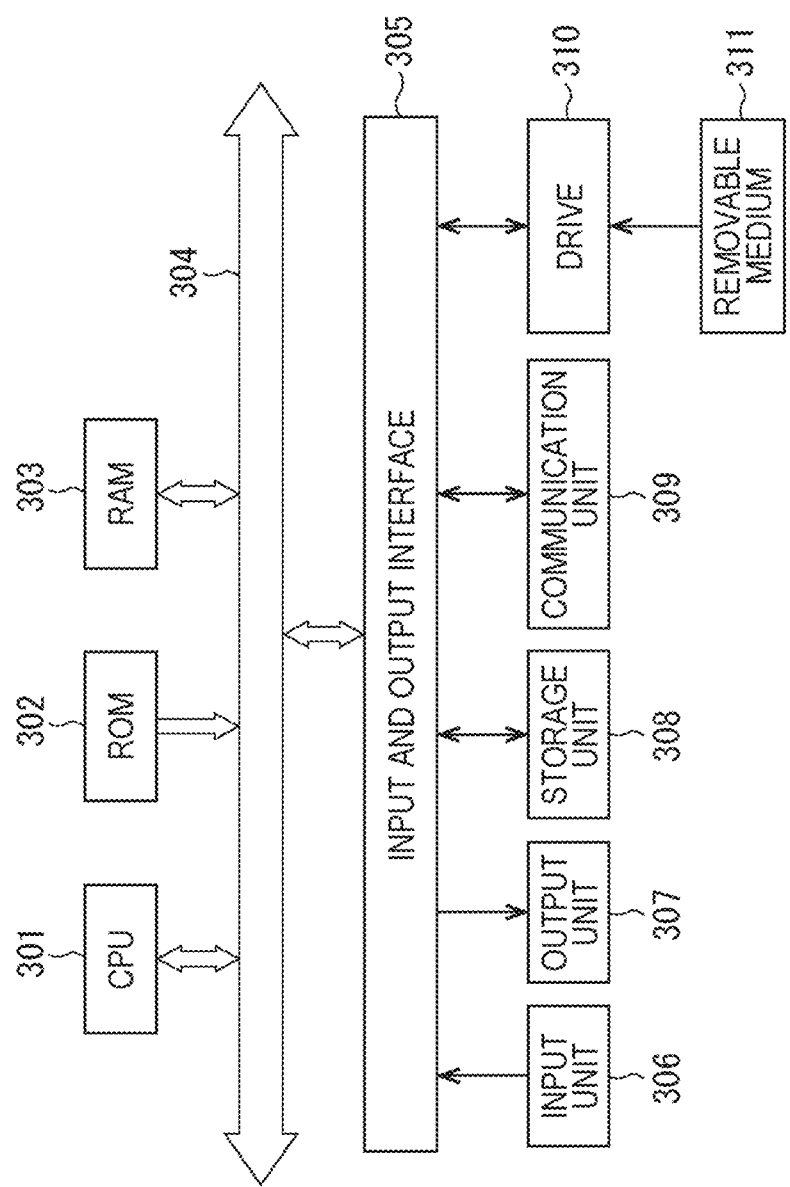
FIG. 33 is a block diagram illustrating a configuration example of a computer.

FIG. 33 is a block diagram illustrating a configuration example of hardware of the computer that executes the above-described series of processing by the program.

A central processing unit (CPU) 301, a read only memory (ROM) 302, and a random access memory (RAM) 303 are connected to each other via a bus 304.

An input and output interface 305 is connected to the bus 304 as well. An input unit 306 including a keyboard, a mouse, and the like, and an output unit 307 including a display, a speaker, and the like are connected to the input and output interface 305. Furthermore, a storage unit 308 including a hard disk, a nonvolatile memory, and the like, a communication unit 309 including a network interface and the like, and a drive 310 that drives a removable medium 311 are connected to the input and output interface 305.

In the computer configured as described above, for example, the CPU 301 loads the program stored in the storage unit 308 into the RAM 303 via the input and output interface 305 and the bus 304 and executes the program, and thus the above-described series of processing is performed.

The program executed by the CPU 301 is provided, for example, by being recorded in the removable medium 311 or via a wired or wireless transmission medium such as a local area network, the Internet, or digital broadcasting, and is installed in the storage unit 308.

Note that, the program executed by the computer may be a program by which processing is performed in time series in order described in the present specification, or may be a program by which processing is performed in parallel or at a necessary timing when a call is made.

Note that, in the present specification, a system means a set of a plurality of constituent elements (devices, modules (parts), and the like), and it does not matter whether or not all the constituent elements are in the same housing. Therefore, a plurality of devices housed in separate housings and connected via a network and one device in which a plurality of modules is housed in one housing are both systems.

Furthermore, the effects described in the present specification are merely examples and are not limited, and other effects may be provided.

An embodiment of the present technology is not limited to the above-described embodiments, and various modifications can be made without departing from the gist of the present technology.

For example, the present technology can have a cloud computing configuration in which one function is shared and processing is performed in cooperation by a plurality of devices via a network.

Furthermore, each step described in the above-described flowchart can be executed by one device or can be shared and executed by a plurality of devices.

Moreover, in a case where a plurality of processing is included in one step, the plurality of processing included in one step can be executed by one device or can be shared and executed by a plurality of devices.

Combination Example of Configuration

The present technology can also have the following configurations.

(1)
A wireless communication device including:
a wireless communication unit configured to perform uplink transmission, which is transmission from a wireless communication terminal, in coordination with another wireless communication device; and
a communication control unit configured to acquire, from the another wireless communication device, transmission method information indicating a transmission method of a downlink control signal which is a control signal necessary for the uplink transmission, or information necessary for determining the transmission method.

(2)
The wireless communication device according to (1),
in which the wireless communication device is a wireless communication device that acquires a transmission opportunity, and
the communication control unit acquires information regarding the wireless communication terminal that is triggered to perform the uplink transmission by the another wireless communication device as information necessary for determining the transmission method, and determines the transmission method.

(3)
The wireless communication device according to (2),
in which the communication control unit determines whether or not the communication control unit and the another wireless communication device are capable of simultaneously transmitting the downlink control signal by using the same resource on the basis of information regarding a propagation loss between the communication control unit and another wireless communication device and all the wireless communication terminals that perform the uplink transmission.

(4)
The wireless communication device according to (2) or (3),
in which the communication control unit determines whether or not the downlink control signal is capable of being transmitted in a frequency multiplexing manner on the basis of a bandwidth in which the communication control unit acquires the transmission opportunity.

(5)
The wireless communication device according to (4),
in which in a case where it is determined that the downlink control signal is capable of being transmitted in the frequency multiplexing manner, the communication control unit determines an appropriate frequency multiplexing method on the basis of a carrier sensing result of the another wireless communication device and capability information indicating a function of the another wireless communication device.

(6)
The wireless communication device according to (5),
in which the frequency multiplexing method includes Coordinated OFDMA or Channel Switching.

(7)
The wireless communication device according to any one of (2) to (6),
in which in a case where it is determined that the another wireless communication device is not capable of simultaneously transmitting the downlink control signal by using a same resource and the downlink control signal is not capable of being transmitted in the frequency multiplexing manner, the communication control unit exchanges information of the downlink control signal with the another wireless communication device, generates the same downlink control signal in the communication control unit and the another wireless communication device, and performs control to simultaneously transmit the generated downlink control signal by using the same resource.

(8)
The wireless communication device according to any one of (2) to (7),
in which the wireless communication unit transmits information indicating the determined transmission method to the another wireless communication device, and transmits the downlink control signal to the wireless communication terminal by using the determined transmission method.

(9)
The wireless communication device according to any one of (1) to (8),
in which the wireless communication device is a wireless communication device that acquires a transmission opportunity, and
the wireless communication unit transmits the downlink control signal to the wireless communication terminal by using a transmission method indicated by the transmission method information.

(10)
The wireless communication device according to (1),
in which the wireless communication device is a wireless communication device that shares a transmission opportunity of the another wireless communication device, and
the communication control unit determines a transmission method of the downlink control signal on the basis of transmission parameter information of the downlink control signal, notification of which is provided from the another wireless communication device that acquires the transmission opportunity as information necessary for determining the transmission method.

(11)
The wireless communication device according to (10),
in which the communication control unit determines whether or not the communication control unit and the another wireless communication device are capable of simultaneously transmitting the downlink control signal by using the same resource on the basis of information regarding a propagation loss between the communication control unit and another wireless communication device and all the wireless communication terminals that perform the uplink transmission.

(12)
The wireless communication device according to (10) or (11),
in which the communication control unit determines a transmission parameter of the another wireless communication device and transmits the determined transmission parameter to the another wireless communication device on the basis of information regarding a propagation loss between the communication control unit and another wireless communication device and all the wireless communication terminals that perform the uplink transmission in order for the communication control unit and the another wireless communication device to simultaneously transmit the downlink control signal by using the same resource.

(13)
The wireless communication device according to any one of (10) to (12),
in which the communication control unit determines whether or not the downlink control signal is capable of being transmitted in a frequency multiplexing manner for each wireless communication device on the basis of a bandwidth in which the another wireless communication device acquires the transmission opportunity.

(14)
The wireless communication device according to (13),
in which in a case where it is determined that the downlink control signal is capable of being transmitted in the frequency multiplexing manner, the communication control unit determines an appropriate frequency multiplexing method on the basis of a carrier sensing result of the communication control unit and capability information indicating a function of the communication control unit.

(15)
The wireless communication device according to (14),
in which the frequency multiplexing method includes C-OFDMA or Channel Switching.

(16)
The wireless communication device according to any one of (10) to (15),
in which in a case where it is determined that the communication control unit and the another wireless communication device are not capable of simultaneously transmitting the downlink control signal by using the same resource and the downlink control signal is not capable of being transmitted in the frequency multiplexing manner, the communication control unit exchanges information of the downlink control signal with the another wireless communication device, and
the wireless communication unit acquires the same downlink control signal generated to transmit the downlink control signal by using the same resource in the wireless communication unit and the another wireless communication device.

(17)
The wireless communication device according to any one of (10) to (16),
in which the wireless communication unit transmits information indicating the determined transmission method to the another wireless communication device, and transmits the downlink control signal to the wireless communication terminal by using the determined transmission method.

(18)
The wireless communication device according to any one of (1) to (17),
in which the wireless communication device is a wireless communication device that shares a transmission opportunity, and
the wireless communication unit transmits the downlink control signal to the wireless communication terminal by using a transmission method indicated by the transmission method information.

(19)
A wireless communication method causing a wireless communication device to acquire transmission method information indicating a transmission method of a downlink control signal which is a control signal necessary for an uplink transmission or information necessary for determining the transmission method from a wireless communication unit configured to perform the uplink transmission which is transmission from a wireless communication terminal in coordination with another wireless communication device and the another wireless communication device.

REFERENCE SIGNS LIST 11-1, 11-2, 11 Wireless communication device
12-1 to 12-4, 12 Wireless communication terminal
31 Wireless communication unit
32 Control unit
33 Storage unit
41 Antenna
51 Amplification unit
52 Wireless interface unit
53 Signal processing unit
54 Data processing unit
55 Communication control unit
56 Communication storage unit

The invention claimed is:

1. A wireless communication device comprising:
a wireless communication circuit configured to perform uplink transmission, which is transmission from a wireless communication terminal, in coordination with another wireless communication device; and
a communication control circuit configured to acquire, from the another wireless communication device, transmission method information indicating a transmission method of a downlink control signal which is a control signal necessary for the uplink transmission, or information necessary for determining the transmission method,
wherein the wireless communication device is a wireless communication device that acquires a transmission opportunity, and the communication control circuit acquires information regarding the wireless communication terminal that is triggered to perform the uplink transmission by the another wireless communication device as information necessary for determining the transmission method, and determines the transmission method,
wherein the communication control circuit determines whether or not the communication control circuit and the another wireless communication device are capable of simultaneously transmitting the downlink control signal by using a same resource on a basis of information regarding a propagation loss between the communication control circuit and another wireless communication device and all the wireless communication terminals that perform the uplink transmission, or
wherein the communication control circuit determines whether or not the downlink control signal is capable of being transmitted in a frequency multiplexing manner on a basis of a bandwidth in which the communication control circuit acquires the transmission opportunity, or
wherein in a case where it is determined that the another wireless communication device is not capable of simultaneously transmitting the downlink control signal by using a same resource and the downlink control signal is not capable of being transmitted in a frequency multiplexing manner, the communication control circuit exchanges information of the downlink control signal with the another wireless communication device, generates a same downlink control signal in the communication control circuit and the another wireless communication device and performs control to simultaneously transmit the generated downlink control signal by using a same resource, or wherein the wireless communication circuit transmits information indicating the determined transmission method to the another wireless communication device, and transmits the downlink control signal to the wireless communication terminal by using the determined transmission method.

2. The wireless communication device according to claim 1,
wherein in a case where it is determined that the downlink control signal is capable of being transmitted in the frequency multiplexing manner, the communication control circuit determines an appropriate frequency multiplexing method on a basis of a carrier sensing result of the another wireless communication device and capability information indicating a function of the another wireless communication device.

3. The wireless communication device according to claim 2,
wherein the frequency multiplexing method includes Coordinated OFDMA or Channel Switching.

4. The wireless communication device according to claim 1,
wherein the wireless communication device is a wireless communication device that acquires a transmission opportunity, and
the wireless communication circuit is configured to transmit the downlink control signal to the wireless communication terminal by using the transmission method indicated by the transmission method information.

5. The wireless communication device according to claim 1,
wherein the wireless communication device is a wireless communication device that shares a transmission opportunity, and
the wireless communication circuit is configured to transmit the downlink control signal to the wireless communication terminal by using the transmission method indicated by the transmission method information.

6. A wireless communication device comprising:
a wireless communication circuit configured to perform uplink transmission, which is transmission from a wireless communication terminal, in coordination with another wireless communication device; and
a communication control circuit configured to acquire, from the another wireless communication device, transmission method information indicating a transmission method of a downlink control signal which is a control signal necessary for the uplink transmission, or information necessary for determining the transmission method,
wherein the wireless communication device is a wireless communication device that shares a transmission opportunity of the another wireless communication device, and
the communication control circuit is configured to determine the transmission method of the downlink control signal on a basis of transmission parameter information of the downlink control signal, notification of which is provided from the another wireless communication device that acquires the transmission opportunity as information necessary for determining the transmission method.

7. The wireless communication device according to claim 6,
wherein the communication control circuit determines whether or not the communication control circuit and the another wireless communication device are capable of simultaneously transmitting the downlink control signal by using a same resource on a basis of information regarding a propagation loss between the communication control circuit and another wireless communication device and all the wireless communication terminals that perform the uplink transmission.

8. The wireless communication device according to claim 6,
wherein the communication control circuit determines a transmission parameter of the another wireless communication device and transmits the determined transmission parameter to the another wireless communication device on a basis of information regarding a propagation loss between the communication control circuit and another wireless communication device and all the wireless communication terminals that perform the uplink transmission in order for the communication control circuit and the another wireless communication device to simultaneously transmit the downlink control signal by using a same resource.

9. The wireless communication device according to claim 6,
wherein the communication control circuit determines whether or not the downlink control signal is capable of being transmitted in a frequency multiplexing manner for each wireless communication device on a basis of a bandwidth in which the another wireless communication device acquires the transmission opportunity.

10. The wireless communication device according to claim 9,
wherein in a case where it is determined that the downlink control signal is capable of being transmitted in the frequency multiplexing manner, the communication control circuit determines an appropriate frequency multiplexing method on a basis of a carrier sensing result of the communication control circuit and capability information indicating a function of the communication control circuit.

11. The wireless communication device according to claim 10,
wherein the frequency multiplexing method includes C-OFDMA or Channel Switching.

12. The wireless communication device according to claim 6,
wherein in a case where it is determined that the communication control circuit and the another wireless communication device are not capable of simultaneously transmitting the downlink control signal by using a same resource and the downlink control signal is not capable of being transmitted in a frequency multiplexing manner, the communication control circuit exchanges information of the downlink control signal with the another wireless communication device, and
the wireless communication circuit is configured to acquire a same downlink control signal generated to transmit the downlink control signal by using a same resource in the wireless communication circuit and the another wireless communication device.

13. The wireless communication device according to claim 6,
wherein the wireless communication circuit is configured to transmit:
information indicating the determined transmission method to the another wireless communication device, and
the downlink control signal to the wireless communication terminal by using the determined transmission method.

14. A wireless communication method performed by a wireless communication device and comprising:
performing uplink transmission, which is transmission from a wireless communication terminal, in coordination with another wireless communication device; and
acquiring, from the another wireless communication device, transmission method information indicating a transmission method of a downlink control signal which is a control signal necessary for the uplink transmission, or information necessary for determining the transmission method,
wherein the wireless communication device is a wireless communication device that acquires a transmission opportunity,
wherein the acquiring comprises acquiring information regarding the wireless communication terminal that is triggered to perform the uplink transmission by the another wireless communication device as information necessary for determining the transmission method, and determines the transmission method, and
wherein the method further comprises:
determining whether or not the communication control circuit and the another wireless communication device are capable of simultaneously transmitting the downlink control signal by using a same resource on a basis of information regarding a propagation loss between the communication control circuit and another wireless communication device and all the wireless communication terminals that perform the uplink transmission, or
determining whether or not the downlink control signal is capable of being transmitted in a frequency multiplexing manner on a basis of a bandwidth in which the communication control circuit acquires the transmission opportunity, or
in a case where it is determined that the another wireless communication device is not capable of simultaneously transmitting the downlink control signal by using a same resource and the downlink control signal is not capable of being transmitted in a frequency multiplexing manner exchanging information of the downlink control signal with the another wireless communication device, generating a same downlink control signal in the communication control circuit and the another wireless communication device, and performing control to simultaneously transmit the generated downlink control signal by using a same resource, or
transmitting information indicating the determined transmission method to the another wireless communication device, and transmitting the downlink control signal to the wireless communication terminal by using the determined transmission method.

15. A wireless communication method performed by a wireless communication device and comprising:
performing uplink transmission, which is transmission from a wireless communication terminal, in coordination with another wireless communication device; and
acquiring, from the another wireless communication device, transmission method information indicating a transmission method of a downlink control signal which is a control signal necessary for the uplink transmission, or information necessary for determining the transmission method, wherein the wireless communication device is a wireless communication device that shares a transmission opportunity of the another wireless communication device, and wherein the method further comprises determining the transmission method of the downlink control signal on a basis of transmission parameter information of the downlink control signal, notification of which is provided from the another wireless communication device that acquires the transmission opportunity as information necessary for determining the transmission method.

* * * * *